United States Patent
Monteuuis et al.

(10) Patent No.: US 12,005,833 B2
(45) Date of Patent: Jun. 11, 2024

(54) AUTOMATED CONTROL OF HEADLIGHT ILLUMINATION BY ONBOARD VEHICLE-TO-EVERYTHING (V2X) DEVICE

(71) Applicant: QUALCOMM Incorporated, San Diego, CA (US)

(72) Inventors: Jean-Philippe Monteuuis, Northborough, MA (US); Sumant Paranjpe, San Diego, CA (US); Jonathan Petit, Wenham, MA (US); Mohammad Raashid Ansari, Lowell, MA (US); Cong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,326

(22) Filed: Sep. 22, 2022

(65) Prior Publication Data

US 2024/0101018 A1     Mar. 28, 2024

(51) Int. Cl.
*B60Q 1/08*     (2006.01)
*B60W 40/02*     (2006.01)
*H04W 4/44*     (2018.01)

(52) U.S. Cl.
CPC ............ *B60Q 1/085* (2013.01); *B60W 40/02* (2013.01); *H04W 4/44* (2018.02); *B60Q 2300/45* (2013.01); *B60W 2420/403* (2013.01); *B60W 2420/408* (2024.01)

(58) Field of Classification Search
CPC ... B60Q 1/085; B60Q 2300/45; B60W 40/02; H04W 4/44
See application file for complete search history.

(56) References Cited

U.S. PATENT DOCUMENTS

| | | | |
|---|---|---|---|
| 7,131,754 B2 | 11/2006 | Schofield | |
| 9,313,862 B1 | 4/2016 | Helton | |
| 9,637,047 B2 | 5/2017 | Meisner et al. | |
| 9,731,645 B1 * | 8/2017 | Taleb-Bendiab | H05B 47/19 |
| 10,696,222 B1 * | 6/2020 | Pandit | G06Q 50/30 |
| 11,198,386 B2 | 12/2021 | Mulligan | |
| 11,603,033 B2 * | 3/2023 | Mizuno | B60Q 1/143 |
| 2003/0137849 A1 | 7/2003 | Alden | |

(Continued)

FOREIGN PATENT DOCUMENTS

EP     3228499 A2     10/2017

OTHER PUBLICATIONS

International Search Report and Written Opinion—PCT/US2023/072737—ISA/EPO—dated Oct. 31, 2023.

*Primary Examiner* — Benyam Haile
(74) *Attorney, Agent, or Firm* — QUALCOMM Incorporated

(57) ABSTRACT

In an aspect, a method of wireless communication performed by a vehicle-to-everything (V2X) device onboard a vehicle includes receiving one or more V2X safety messages indicating a potential safety condition related to illumination of an object; determining, in response to the one or more V2X safety messages, that the object is within or approaching a target area in which illumination of the object by headlights of the vehicle can be adjusted; and controlling an illumination intensity and/or an illumination pattern of the headlights of the vehicle in response to determining that the object is within the target area.

38 Claims, 9 Drawing Sheets

(56) References Cited

U.S. PATENT DOCUMENTS

| | | | |
|---|---|---|---|
| 2016/0167567 A1* | 6/2016 | Foltin | B60Q 1/143 |
| | | | 315/82 |
| 2020/0001774 A1 | 1/2020 | Kim | |
| 2021/0146821 A1 | 5/2021 | Yoon | |
| 2021/0213873 A1 | 7/2021 | Martin et al. | |
| 2022/0141450 A1* | 5/2022 | Pieper | G06T 7/0002 |
| | | | 348/148 |

* cited by examiner

AUTOMATED CONTROL OF HEADLIGHT ILLUMINATION BY ONBOARD VEHICLE-TO-EVERYTHING (V2X) DEVICE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a vehicle-to-everything (V2X) device onboard a vehicle includes receiving one or more V2X safety messages indicating a potential safety condition related to illumination of an object; determining, in response to the one or more V2X safety messages, that the object is within or approaching a target area in which illumination of the object by headlights of the vehicle can be adjusted; and controlling an illumination intensity and/or an illumination pattern of the headlights of the vehicle in response to determining that the object is within or approaching the target area.

In an aspect, a method of wireless communication performed by a vehicle-to-everything (V2X) device associated with an object includes determining that a potential safety condition exists at the object, wherein the potential safety condition corresponds to a condition in which illumination of the object by headlights of a vehicle should be controlled; and transmitting one or more V2X safety messages indicating that the potential safety condition exists at the object.

In an aspect, a method of wireless communication performed by a vehicle-to-everything (V2X) device onboard a vehicle includes determining that a potential beam blinding condition exists at the vehicle, wherein the potential beam blinding condition corresponds to a likelihood of interference with safe operation of the vehicle due to excessive headlight illumination of the vehicle by a further vehicle; and transmitting one or more V2X beam blinded vehicle safety messages indicating that the potential beam blinding condition exists at the vehicle.

In an aspect, a vehicle-to-everything (V2X) device onboard a vehicle includes a memory; at least one transceiver; and at least one processor communicatively coupled to the memory and the at least one transceiver, the at least one processor configured to: receive, via the at least one transceiver, one or more V2X safety messages indicating a potential safety condition related to illumination of an object; determine, in response to the one or more V2X safety messages, that the object is within or approaching a target area in which illumination of the object by headlights of the vehicle can be adjusted; and control an illumination intensity and/or an illumination pattern of the headlights of the vehicle in response to determining that the object is within or approaching the target area.

In an aspect, a vehicle-to-everything (V2X) device onboard a vehicle includes a memory; at least one transceiver; and at least one processor communicatively coupled to the memory and the at least one transceiver, the at least one processor configured to: determine that a potential safety condition exists at the object, wherein the potential safety condition corresponds to a condition in which illumination of the object by headlights of a vehicle should be controlled; and transmit, via the at least one transceiver, one or more V2X safety messages indicating that the potential safety condition exists at the object.

In an aspect, a vehicle-to-everything (V2X) device onboard a vehicle includes a memory; at least one transceiver; and at least one processor communicatively coupled to the memory and the at least one transceiver, the at least one processor configured to: determine that a potential beam blinding condition exists at the vehicle, wherein the potential beam blinding condition corresponds to a likelihood of interference with safe operation of the vehicle due to excessive headlight illumination of the vehicle by a further vehicle; and transmit, via the at least one transceiver, one or more V2X beam blinded vehicle safety messages indicating that the potential beam blinding condition exists at the vehicle.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
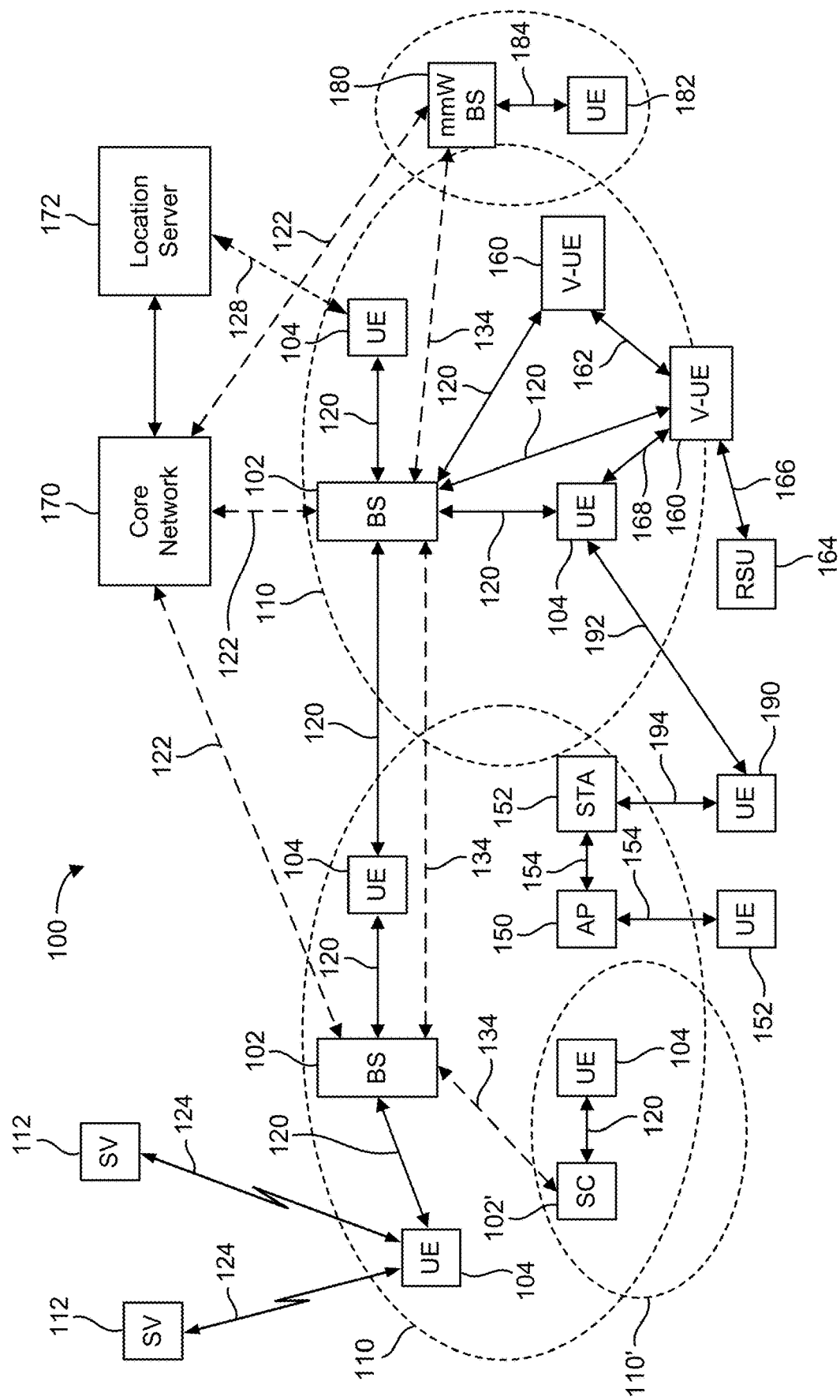
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application-specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle head unit, in-vehicle infotainment system, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, a head unit, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to an NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V20), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and/or other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and/or heading of the V-UE 160 and the position, speed (e.g., where the UE 104 is carried by a user on a bicycle), and/or heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beam forming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN station (STA) 152 connected to the WLAN access point (AP) 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2:
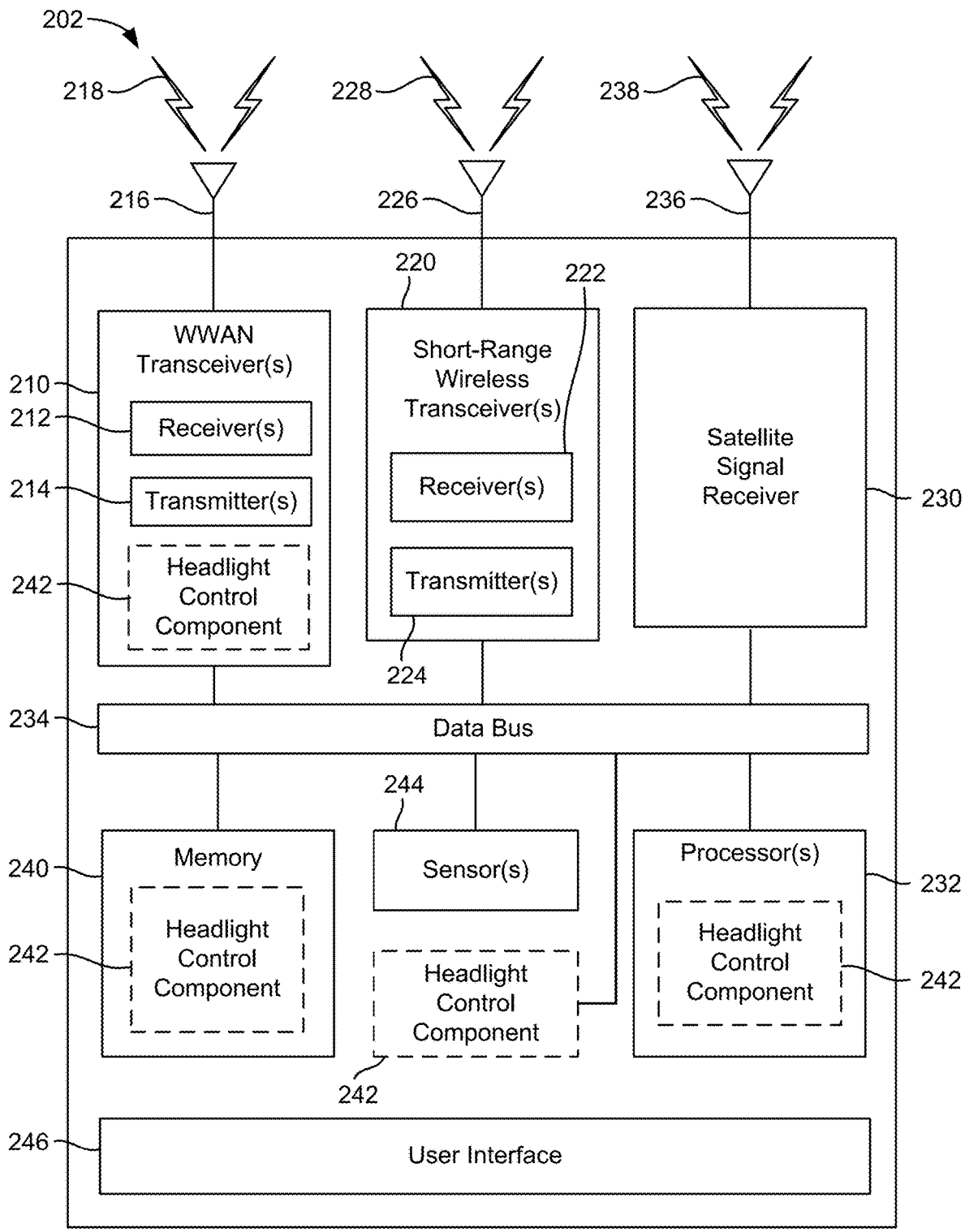
FIG. 2 is a simplified block diagram of several sample aspects of components that may be employed in a user equipment (UE) and/or vehicle-to-everything device, according to aspects of the disclosure.

FIG. 2 illustrates example components (represented by corresponding blocks) that may be incorporated into a UE 202 (which may correspond to any of the UEs described herein including any V2X device disclosed herein). It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 202 includes one or more wireless wide area network (WWAN) transceivers 210 providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 210 may each be connected to one or more antennas 216 for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 210 may be variously configured for transmitting and encoding signals 218 (e.g., messages, indications, information, and so on), respectively, and, conversely, for receiving and decoding signals 218 (e.g., messages, indications, information, pilots, and so on), respectively, in accordance with the designated RAT. Specifically, the WWAN transceivers 210 include one or more transmitters 214 for transmitting and encoding signals 218 and one or more receivers 212 for receiving and decoding signals 218.

The UE 202 also includes, at least in some cases, one or more short-range wireless transceivers 220. The short-range wireless transceivers 220 may be connected to one or more antennas 226 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 220 may be variously configured for transmitting and encoding signals 228 (e.g., messages, indications, information, and so on) and, conversely, for receiving and decoding signals 228 (e.g., messages, indications, information, pilots, and so on) in accordance with the designated RAT. Specifically, the short-range wireless transceivers 220 include one or more transmitters 224 for transmitting and encoding signals 228, and one or more receivers 222 for receiving and decoding signals 228. As specific examples, the short-range wireless transceivers 220 and 260 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 202 includes, at least in some cases, satellite signal receivers 230. The satellite signal receivers 230 may be connected to one or more antennas 236, and may provide means for receiving and/or measuring satellite positioning/communication signals 238. Where the satellite signal receivers 230 are satellite positioning system receivers, the satellite positioning/communication signals 238 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 230 are non-terrestrial network (NTN) receivers, the satellite positioning/communication signals 238 may be communication signals (e.g., carrying control and/or user data) originating from a 5G network. The satellite signal receivers 230 may comprise any suitable hardware and/or software for receiving and processing satellite positioning/communication signals 238. The satellite signal receivers 230 may request information and operations as appropriate from the other systems, and, at least in some cases, perform calculations to determine locations of the UE 202 using measurements obtained by any suitable satellite positioning system algorithm.

The UE 202 also include other components that may be used in conjunction with the operations disclosed herein. The UE 202 includes one or more processors 232 for providing functionality relating to, for example, wireless communication, and for providing other processing functionality. The processors 232 may therefore provide means for processing, such as means for determining, means for calculating, means for receiving, means for transmitting, means for indicating, etc. In an aspect, the processors 232 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 202 also includes memory circuitry implementing memories 240 (e.g., each including a memory device) for maintaining information (e.g., information indicative of reserved resources, thresholds, parameters, and so on). The memories 240 may therefore provide means for storing, means for retrieving, means for maintaining, etc. In some cases, the UE 202 may include a headlight control component 242. The headlight control component 242 may be hardware circuits that are part of or coupled to the processors 232 that, when executed, cause the UE 202 to perform the functionality described herein. In other aspects, the headlight control component 242 may be external to the processors 232 (e.g., part of a headlight control system, integrated with another processing system, etc.). Alternatively, the headlight control component 242 may be memory modules stored in the memories 240 that, when executed by the processors 232 cause the UE 202 to perform the functionality described herein. FIG. 2 illustrates possible locations of the headlight control component 242, which may be, for example, part of the one or more WWAN transceivers 210, the memory 240, the one or more processors 232, or any combination thereof, or may be a standalone component.

The UE 202 may include one or more sensors 244 coupled to the one or more processors 232 to provide means for sensing or detecting movement and/or orientation information that is independent of motion data derived from signals received by the one or more WWAN transceivers 210. By way of example, the sensor(s) 244 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 244 may include a plurality of different types of devices and combine their outputs in order to provide motion information. For example, the sensor(s) 244 may use a combination of a multi-axis accelerometer and orientation sensors to provide the ability to compute positions in two-dimensional (2D) and/or three-dimensional (3D) coordinate systems. Other types of sensors used by the headlight control component 242 are also described herein.

In addition, the UE 202 may include a user interface 246 providing means for providing indications (e.g., audible and/or visual indications) to a user and/or for receiving user input (e.g., upon user actuation of a sensing device such a keypad, a touch screen, a microphone, and so on).

At the UE 202, the receiver 212 receives a signal through its respective antenna(s) 216. The receiver 212 recovers information modulated onto an RF carrier and provides the information to the one or more processors 232. The transmitter 214 and the receiver 212 implement Layer-1 functionality associated with various signal processing functions. The receiver 212 may perform spatial processing on the information to recover any spatial streams destined for the UE 202. If multiple spatial streams are destined for the UE 202, they may be combined by the receiver 212 into a single OFDM symbol stream. The receiver 212 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 204. These soft decisions may be based on channel estimates computed by a channel estimator. The soft decisions are then decoded and de-interleaved to recover the data and control signals that were originally transmitted by the base station 204 on the physical channel. The data and control signals are then provided to the one or more processors 232, which implements Layer-3 (L3) and Layer-2 (L2) functionality.

In the downlink, the one or more processors 232 provides demultiplexing between transport and logical channels, packet reassembly, deciphering, header decompression, and control signal processing to recover IP packets from the core network. The one or more processors 232 are also responsible for error detection.

For convenience, the UE 202 is shown in FIG. 2 as including various components that may be configured according to the various examples described herein. It will be appreciated, however, that the illustrated components may have different functionality in different designs. In particular, various components in FIG. 2 are optional in alternative configurations and the various aspects include configurations that may vary due to design choice, costs, use of the device, or other considerations. For example, in case of FIG. 2, a particular implementation of UE 202 may omit the WWAN transceiver(s) 210 (e.g., a wearable device or tablet computer or PC or laptop may have Wi-Fi and/or Bluetooth capability without cellular capability), or may omit the short-range wireless transceiver(s) 220 (e.g., cellular-only, etc.), or may omit the satellite signal receiver 230, or may omit the sensor(s) 244, and so on. For brevity, illustration of the various alternative configurations is not provided herein, but would be readily understandable to one skilled in the art.

The various components of the UE 202 may be communicatively coupled to each other over data bus 234. In an aspect, the data bus 234 may form, or be part of, a communication interface of the UE 202. For example, where different logical entities are embodied in the same device, the data bus 234 may provide communication between them.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 246 may be implemented by processor and memory component(s) of the UE 202 (e.g., by execution of appropriate code and/or by appropriate configuration of processor components).

As noted herein, V2X communication, including cellular vehicle-to-everything (CV2X) communication, is the passing of information from a vehicle to any entity that may affect the vehicle, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), Vehicle-to-Device (V2D), and Vehicle-to-Grid (V2G). The main motivations for V2X communication are road safety, traffic efficiency, and energy savings. For purposes of this disclosure, V2X systems include any one or more such specific types of communications. In the context of the present disclosure, a vehicle is a motorized road vehicle such as cars, trucks, buses, motorbikes, etc., including e-bikes, e-scooters and other road-bound means of transport.

V2X communication may be implemented using Dedicated Short Range Communication (DSRC) Wireless Local Area Network (WLAN) technology or cellular technology as well as NR technology. V2X NR systems may be implemented using sidelink communications standards set forth in NR cellular standards to implement high-throughput, low latency communications between V2X devices. The types of information communicated between V2X devices may include Decentralized Environmental Notification Messages (DENM) and/or Basic Safety Messages (BSM).

The data volume of BSM and DENM transmissions is low. Examples of BSM transmissions include one or more of:

Time, Latitude, Longitude, Elevation
Position Accuracy (estimate)
Speed, Heading, Acceleration, Yaw Rate
Steering Wheel Angle, Transmission State, Brake System Status
Vehicle Size (Length and Width)
Path History and Path Prediction
Event Flags (e.g., hard braking, traction control, etc.)
Exterior Lights Various automatic systems have been designed to control, e.g., dim, reshape, and/or redirect, the high beams of a (road-bound) vehicle. Such a system may use technologies including imaging sensors, analog ambient light sensors, digital camera and vehicle recognition algorithms, and/or adjustable, e.g., moveable, dimmable, segmented, etc., headlights. Many such systems rely solely on sensors that require Line of Sight (LOS) conditions between the vehicle using high beams and an object, such as another road user or a traffic signs, and work only in a "head-on" approach configuration. Such systems may not work reliably when hilly terrain or slight corners are encountered because the other road user, such as an oncoming vehicle, is not visible at a distance (i.e., Non-Line of Sight (NLOS) conditions).

To accommodate NLOS-based adjustment, e.g., dimming, reshaping, and/or redirecting, of headlight beams, some systems resort to V2X communications on board a vehicle to determine when to adjust the vehicle's headlights to accommodate another road user, such as another vehicle. Such systems use the position and motion characteristics of the other vehicle as indicated in the V2X communications from the other vehicle to determine when the headlights of the vehicle are to be switched from a high beam to a low beam state or otherwise adjusted.

Certain aspects of the disclosure are implemented with a recognition of the inherent deficiencies of prior headlight control systems. In certain aspects, the headlight control system of the disclosure may be configured to control the illumination intensity and/or illumination pattern of the vehicle's headlights (e.g., headlights of the "subject vehicle") in response to objects and conditions other than those specifically associated with another vehicle. In certain aspects, the headlight control system may be configured to control the pattern of the illumination provided by the headlights as opposed to merely controlling the illumination intensity of the headlights in a binary manner (high-beam-to-low). In accordance with certain aspects of the disclosure, the headlight control system may control the intensity of light emitted by individual lighting elements of the headlights to provide a desired illumination pattern, e.g., by selectively turning on/off individual lighting elements or groups of lighting elements. In certain aspects, the headlight control system may be configured to increase the illumination of an object by the headlights under certain conditions and decrease the illumination of the object under other conditions. In certain aspects, the headlight control system may already be in a proper state for illuminating the object and, as such, may maintain the current illumination intensity and/or illumination pattern.

In accordance with certain aspects of the disclosure, indication or determination of (the existence of) a potential safety condition at an object may be based upon the reception of one or more V2X safety messages by a V2X device onboard a subject vehicle. The subject vehicle in the present disclosure is a vehicle equipped with controllable (dimmable, selectively controllable, steerable, and/or the like) headlights. The one or more V2X messages may expressly indicate a need for the subject vehicle to control the intensity with which the headlights illuminate the object. In an aspect, an indication of the existence of the potential safety condition may be transmitted in the data of a BSM and/or DENM communication by a V2X system co-located with the object (e.g., onboard the object, carried by the object, in proximity to the object) or having knowledge of the potential safety condition of the object (e.g., a roadside unit (RSU)) without being co-located with the object. In other words, the V2X system may be spatially and/or communicatively associated with the object.

The safety message may simply indicate that the potential safety condition exists at the object. However, in accordance with certain aspects of the disclosure, the safety message(s) may also expressly indicate other information such as 1) whether illumination of the object is needed to ensure its visibility, 2) whether the illumination of the object should be reduced to limit the risk of causing a blinding condition at the object, 3) the type of object, or 4) any combination thereof.

With regard to the illumination of the object, the potential safety condition indicated by the safety message may be a condition that may be addressed by increasing the visibility of the object to the driver of the subject vehicle or, in the case of an autonomously operating subject vehicle, to image sensors controlling the operation of the subject vehicle. In such instances, for example, the illumination intensity and/or illumination pattern of the headlights may be adjusted to increase the intensity of the light beams emitted toward the object. If the intensity of the light beams emitted by the headlights toward the object is already maximized, the headlight control system may maintain the illumination intensity and/or illumination pattern in that state.

Alternatively, the potential safety condition indicated by the safety message may be a condition in which the illumination of the object should be limited to reduce the likelihood of blinding an individual at the object or, in the case of autonomous operation of the object, a likelihood of that the image sensors used to control operation of the object will be overexposed. In such instances, for example, the illumination intensity and/or illumination pattern of the headlights may be adjusted to reduce the intensity of light beams emitted by the headlights toward the object.

The headlight control system of the present disclosure is applicable to a wide range of use cases. In an aspect, the object may be a further vehicle and the V2X safety messages may be received from a V2X device onboard the further vehicle. A wide range of vehicle types is contemplated as objects for such use cases. According to various aspects of the disclosure, such vehicles may include motorized road vehicles such as cars, trucks, motorcycles, scooters, motorized wheelchairs, etc. In certain aspects, the type of vehicle may be expressly indicated in the safety message. As an example, the safety message may indicate that the vehicle is one of the foregoing vehicle types. Additionally, or in the alternative, the safety message may indicate the specific nature of the type of vehicle such as, for example, an indication that the vehicle is an emergency vehicle, a construction vehicle, a passenger vehicle, etc.

In another aspect, the object may be a non-motorized vehicle and the V2X safety messages may be received from a V2X device carried by the non-motorized vehicle. A wide range of non-motorized vehicle types are contemplated for such use cases. According to various aspects of the disclosure, such non-motorized vehicles may include bicycles, non-motorized scooters, skateboards, rollerblades, wheelchairs, etc. In certain aspects, the type of non-motorized vehicle may be expressly indicated in the safety message. As an example, the safety message may indicate that the non-motorized vehicle is one of the foregoing non-motorized vehicle types. The V2X device may be carried by the non-motorized vehicle in various manners. For example, the V2X device may be a UE carried by the operator of the non-motorized vehicle. In another example, the V2X device may be a detachable unit that is attached to the non-motorized vehicle while the non-motorized vehicle is operated. In another example, the V2X device may be a fixture of the non-motorized vehicle. Based on the teachings of the present disclosure, it will be recognized that other manners in which the non-motorized vehicle may carry the V2X device may be implemented. As a consequence of the V2X device being carried by the non-motorized vehicle, context information such as location and/or motion information associated with the V2X device equally applies to the associated non-motorized vehicle.

In another aspect, the object may be a pedestrian and the V2X safety messages may be received from a V2X device carried by the pedestrian. The V2X device may be carried by the pedestrian in various manners. For example, the V2X device may be a UE carried by the pedestrian. In another example, the V2X device may be affixed to or otherwise integrated with a piece of clothing worn by the pedestrian. Based on the teachings of the present disclosure, it will be recognized that other manners in which the pedestrian may carry the V2X device may be implemented. As a consequence of the V2X device being carried by the pedestrian, context information such as location and/or motion information associated with the V2X device equally applies to the associated pedestrian.

In certain aspects, the fact that the V2X device is associated with a pedestrian may be expressly indicated in the safety message. In certain aspects, the safety message may further indicate certain disabilities (e.g., blindness, hearing impairment, mobility impairment, etc.) possessed by the pedestrian.

In another aspect, the object may be road signage and the V2X safety messages may be received from a V2X device carried by the road signage and/or a V2X device having knowledge of the location of the road signage and, optionally, the characteristics of the road signage. The V2X device may be carried by the road signage in various manners. For example, the V2X device may be affixed to or otherwise integrated with the road signage. In another example, the V2X safety message may be received from a V2X device having knowledge of the location and/or characteristics of the road signage without being co-located with the road signage. For example, the V2X safety message may be received from a roadside unit (RSU). In certain aspects of the present disclosure, being co-located with an object may indicate being carried by or attached to the object. In other aspects, being co-located with an object may indicate being within visible range and/or communication range with the object. By way of example, an RSU may visibly detect a road hazard or be in (wireless) communication with a traffic signal. By contrast, a non-co-located RSU may have (configured) knowledge of the locations of safety-related road signage and indicate the same to the subject vehicle in the V2X safety messages. In certain aspects, such an RSU may have knowledge of the location and/or type of multiple road signs in a particular area and transmit V2X safety messages associated with each such road sign. Based on the teachings of the present disclosure, it will be recognized that other manners in which the V2X device is associated with the road signage may be implemented.

In certain aspects, the fact that the V2X device is associated with road signage may be expressly indicated in the safety message. In certain aspects, the safety message may indicate the type of road signage (e.g., stop sign, yield sign, speed limit sign, road entrance/exit identifiers, road condition or characteristic signage, construction signage, etc.)

In another aspect, the object may be a road hazard and the V2X safety messages may be received from a V2X device at the site of the road hazard and/or a V2X device having knowledge of the location and, optionally, the characteristics of the road hazard. In certain aspects, the fact that the V2X device is associated with a road hazard may be expressly indicated in the safety message. In certain aspects, the safety message may further indicate the type of road hazard (e.g., accident site, road obstruction, lane closure, etc.)

The V2X device may be associated with the road hazard in various manners. For example, the V2X device may be co-located with the road hazard. In another example, the V2X safety message may be received from a V2X device having knowledge of the location and/or characteristics of the road hazard without being co-located with the road hazard. For example, the V2X safety message may be received from a roadside unit (RSU). In certain aspects, such an RSU may have knowledge of the location and/or type of multiple road hazards in a particular area and transmit V2X safety messages associated with each such road hazard. Based on the teachings of the present disclosure, it will be recognized that other manners in which the V2X device is associated with the road hazard may be implemented.

Additionally, or in the alternative, the type of object may be determined based on information received from one or more image sensors of the subject vehicle. In certain aspects, image sensor data may be used to identify the type of object associated with the V2X safety messages. As an example, image information may be used to determine whether the object is a vehicle, a non-motorized vehicle, road construction, an emergency vehicle, a pedestrian, etc.

As described herein, the illumination intensity and/or illumination pattern of the headlights may be adjusted based on the characteristics, e.g., type, of the object and/or the conditions at the object. In certain aspects, the illumination intensity and/or illumination pattern is adjusted to maintain or enhance the illumination of the object. In certain aspects, the illumination intensity and/or illumination pattern is adjusted to reduce the illumination of the object to prevent blinding of persons at the object and/or over-exposure of image sensors used in the operation of the object.

Whether the illumination intensity and/or illumination pattern is controlled to maintain, increase, or reduce the illumination of the object by the headlights may be based on default responses configured at the subject vehicle's onboard V2X device. For example, the onboard V2X device may default to reducing the intensity of light beams emitted toward the object for all object types. In other examples, the onboard V2X device may default to maintaining or increasing the intensity of light beams emitted toward the object for all object types.

In accordance with certain aspects of the disclosure, the onboard V2X device may control the illumination intensity and/or illumination pattern provided by the headlights based on the type of object. For example, the onboard V2X device may control the illumination intensity and/or illumination pattern of the headlights to increase the illumination of objects that are generally stationary or slow moving (e.g., non-motorized road users), such as road signage, road hazards, non-motorized vehicles, pedestrians, etc. In other examples, the onboard V2X system may control the illumination intensity and/or illumination pattern of the headlights to reduce the illumination of objects that are driver-operated or autonomous motorized vehicles, such as emergency vehicles, passenger vehicles, construction vehicles, etc.

In certain aspects, the onboard V2X device may control the illumination intensity and/or illumination based on the conditions at the object and, optionally, the type of object. For example, the onboard V2X device may control the illumination intensity and/or illumination pattern of the headlights based on a presence of human beings at the object, e.g., operating a vehicle or being within a (configurable) range from the object. In one example, the onboard V2X device may control the illumination intensity and/or illumination pattern of the headlights to maintain or increase the illumination of construction zones when workers are not present and thereby enhance driver and/or image sensor visibility of the construction zone. Additionally, or in the alternative, the onboard V2X device may decrease the illumination intensity and/or illumination pattern of the headlights to reduce the illumination of construction zones when workers are present. The reduced illumination of the construction zone may prevent the blinding of the workers operating in the construction zones. Additionally, the illumination of objects such as non-motorized vehicles and/or pedestrians may be based on the direction of travel of such objects as a condition at the object.

In certain aspects, the onboard V2X device may control the illumination intensity and/or illumination pattern provided by the headlights based on any relative motion between the subject vehicle and the object. A relative motion may comprise a direction and/or a speed of the relative motion. In an aspect, when an object is moving toward the subject vehicle, the onboard V2X device may control the illumination intensity and/or illumination pattern of the headlights to reduce the illumination of the object since an operator at the object is likely to face the direction of the object's motion. Additionally, or in the alternative, when an object is moving away from the subject vehicle, the onboard V2X device may control the illumination intensity and/or illumination pattern of the headlights to increase the illumination of the object since an operator at the object is likely facing in a direction away from the subject vehicle. Consequently, persons operating objects that have a relative motion away from the subject vehicle are not likely to experience blinding by the headlights. Moving toward/away from the subject vehicle may be defined with respect to a road or road network, e.g., if both subject vehicle and object are using the same road or are approaching the same intersection. Determination of the relative motion may be based on map data.

The specific illumination adjustment operations (e.g., increasing illumination of the object from the current illumination level, maintaining the illumination of the object at the current level, or reducing the illumination of the object from the current level) may be pre-configured at the onboard V2X device based on the object type (e.g., as determined from the received safety messages and/or from recognition of images received from the vehicle's image sensors). Additionally, or in the alternative, the onboard V2X device of the subject vehicle may execute illumination adjustment operations based on a type of adjustment indicated in the safety message (e.g., increase the illumination of the object, decrease the illumination of the object, etc.). Based on the teachings of the current disclosure, it will be recognized that other manners of signaling the requisite illumination adjustment operations may be used.

In addition to receiving V2X safety messages indicating that the potential safety condition exists at the object, the onboard V2X device may execute additional operations to qualify whether any adjustments to the illumination intensity and/or illumination pattern of the beams of the headlights should be made. For example, the V2X device may determine whether the object is inside or outside of a target area in which the illumination of the object by the headlights can be adjusted to address the potential safety condition.

In other words, the target area may be defined based on a current illumination intensity and/or a current illumination pattern and/or based on an illumination capability of the headlights. In an aspect, the target area may be defined based on the current illumination intensity and/or current illumination pattern as an area currently illuminated (e.g., with at least a target minimum intensity). This definition of a target area may be used when the type of object, conditions at the object, and/or the V2X safety messages indicate or suggest controlling the illumination intensity and/or illumination pattern of the headlights to reduce the illumination of the object. In another aspect, the target area may be defined based on the illumination capability of the headlights, e.g., as a maximum target area that can be illuminated with the headlights (e.g., with at least a target minimum intensity). The target area can be determined by the V2X device of the subject vehicle based on additional information as detailed below. By way of example, illumination characteristics of the headlights may be taken into account. Additionally or alternatively, a topography of the environment of the subject vehicle (e.g., light blockages due to curves, hills, buildings, and the like) may be considered when determining the target area (e.g., using map data, navigation data, and/or vehicular sensor data). In other words, the target area may be defined as the actual area which is currently illuminated or can be illuminated by the headlights considering the specific context of the subject vehicle. Such context may further include ambient light conditions, e.g., nighttime, active streetlighting, etc. to be considered when determining the target area. By way of example, when controlling illumination settings of headlights to avoid blinding of other road users, the previously described target area may be adjusted according to the ambient light conditions, e.g., increased for low ambient light and reduced for high ambient light (e.g., by applying a scaling based on sensor-measured ambient light levels).

Sensor data and/or map data may be integrated with other position information (e.g., current position and/or projected future position) to determine whether the object is in the target area.

In an aspect, when the V2X device receives the V2X safety messages, it may determine whether the object is or will be within the target area of illumination currently provided or maximally provided by the headlights of the subject vehicle. The onboard V2X device may make this determination based, at least in part, on the current position of the object and/or a projected future position of the object. In an aspect, the current position of the object and/or the projected future position of the object may be based on various information indicated by the V2X safety messages transmitted by a V2X device associated with the object. In an aspect, the projected future position of the object may be based on the current position of the object and 1) the speed of the object indicated in V2X communications relating to the object, 2) a heading of the object indicated in V2X communications relating to the object, and/or 3) a projected path of the object indicated in V2X communications relating to the object. Determination of whether the object will be within the target area of illumination may further be based on a state of motion (position, speed, and/or heading) of the subject vehicle. In other words, the V2X device may determine a projected future target area based on the state of motion of the subject vehicle (according to the above described processes). The projection may be made with a fixed or speed-dependent (of the subject vehicle) time offset.

However, in certain scenarios, the current position of the object and/or projected future position of the object may not provide a full indication as to whether the object is within the headlight illumination pattern of the subject vehicle. As such, in accordance with certain aspects of the disclosure, the position information (e.g., the position information indicated in the V2X safety messages transmitted by the V2X device associated with the object) may be supplemented with additional information.

Various types of supplemental information may be employed in this regard. In an aspect, the supplemental information may be obtained from sensor data. As an example, such sensor data may include image data associated with the external environment of the vehicle. Such image data may be used by the onboard V2X device to identify the figures and/or text in road signs. Based on the road signage, the onboard V2X device may determine that the road conditions as indicated by the road signage (e.g., curves, intersections, terrain indications, etc.) are such that the object is not in the target area of illumination provided by the subject vehicle's headlights as described above. Additionally, or in the alternative, the image data may indicate that there are obstructions (e.g., buildings, walls, road dividers, trees, etc.) to the illumination provided by the subject vehicle's headlights that block the object from the headlight illumination. Additionally, or in the alternative, such obstructions may be detected using light detection and ranging (LIDAR) sensors and/or radio detection and ranging (RADAR) sensors.

Whether the object is in the target area of illumination of the subject vehicle's headlights may also be qualified using map data and/or navigation data. The map data may include V2X map data, online map data provided by a map data server, local map data, or any combination of the foregoing.

In an aspect, the determination that the object is within or approaching the target area of illumination of the headlights of the subject vehicle may include using the map data to detect occluding objects (e.g., buildings, elevation differences between the subject vehicle and the object, etc.) that block illumination of the object by the headlights of the vehicle based on the map data. As an example, a determination that the object is within or approaching the target area of illumination may include a determination that there are no such occluding objects indicated by the map data.

In an aspect, the determination that the object is or will be within the target area of illumination may include detecting a road and/or road lane used by the object and/or used by the subject vehicle based on the map data and/or navigation data (e.g., including satellite and/or dead reckoning positioning data). For example, the onboard V2X device may determine, based on the map data, that the relationship between road lanes (e.g., including shoulders) occupied by the object and the subject vehicle place the object in the target area of illumination. Additionally, or in the alternative, the onboard V2X device may determine, based on the map data, that the relationship between road lanes is such that their spatial relationship and/or relative orientation will not place the object in the target area of illumination. It will be recognized, based on the teachings of the present disclosure, that other relationships between the subject vehicle and the object may be used to determine whether or not the object is in the area of a limitation provided by the vehicle's headlights based on the map data, the foregoing being exemplary.

Sensor data may also be employed to provide supplemental information indicating the (ambient) lighting conditions external to the subject vehicle. In an aspect, if the lighting conditions external to the subject vehicle indicate that it is bright outside the vehicle (e.g., daytime or another condition in which the external lighting effectively negates the need to adjust the illumination provided by the subject vehicle's headlights, etc.), the onboard V2X system need not adjust the intensity of the light beams of the headlights and the V2X message from the object may be ignored or alternatively the target area may be reduced, e.g., by a (configured) scaling factor. Additionally, or in the alternative, if the lighting conditions external to the subject vehicle indicate a low-light condition (e.g., as experienced at nighttime, in a tunnel, below an underpass, etc.), the onboard V2X device may determine that the illumination intensity of the light beams of the headlights may not be ignored and proceed to determine whether the object is in the target area that may further be increased, e.g., by a (configured) scaling factor.

Figure 3:
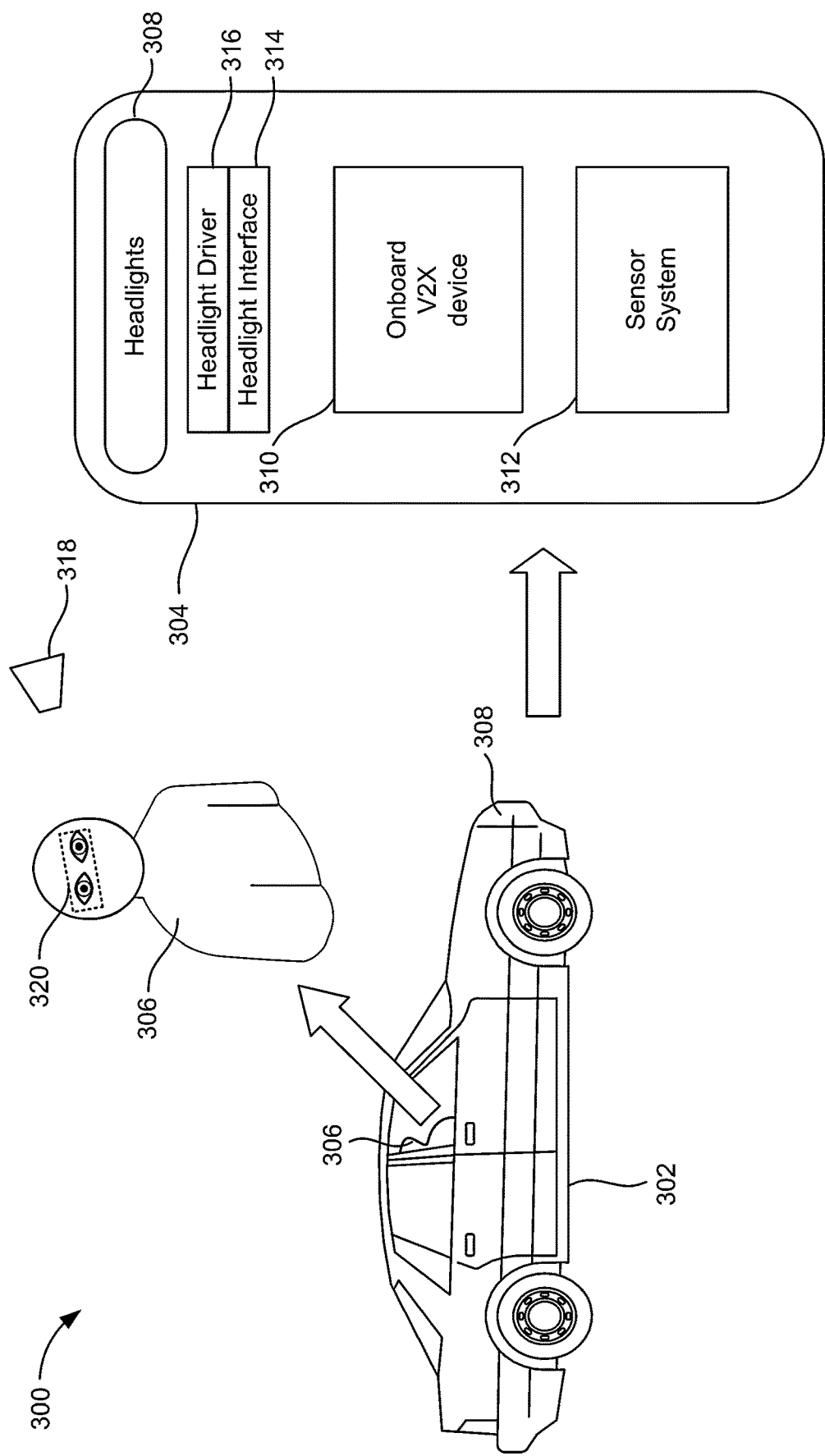
FIG. 3 is a diagram illustrating a subject vehicle and headlight control system, according to aspects of the disclosure.

FIG. 3 is a diagram 300 illustrating a subject vehicle 302 and headlight control system 304, according to aspects of the disclosure. Diagram 300 depicts the subject vehicle 302 having a driver 306 in a passenger cabin. The subject vehicle 302 also has adjustable headlights 308. In accordance with certain aspects of the disclosure, the adjustable headlights 308 may be controlled to increase or decrease the intensity and/or adjust an illumination pattern of light beams emitted by the adjustable headlights 308 toward the object. In certain aspects, the intensity and/or pattern of the light beams emitted by the adjustable headlights 308 may be adjusted so that different areas of the adjustable headlights 308 have different illumination intensities. For example, the adjustable headlights 308 may comprise a plurality of light-emitting elements that are individually adjustable to provide different light intensities, including selectively activating/deactivating individual light-emitting elements or groups of light-emitting elements. In accordance with certain aspects of the disclosure, the shape of the light beams emitted by the headlights is adjustable to provide an illumination pattern that selectively increases or decreases the illumination of the object. As such, the illumination of the object may be selectively adjustable with respect to illumination in areas other than the target area. In an aspect, the illumination pattern may be asymmetric (between left and right headlight beams). Examples of headlights that may be used to implement various examples of the disclosed system include controllable light emitting diode matrix systems (LEDMS) and digital light processing systems (DLPS). In accordance with certain aspects of the disclosure, the headlights may be based on more conventional headlight systems that merely switch between an off condition, a low-beam condition, and a high-beam condition and/or control a set of headlight lenses to steer the respective headlight beam.

In the example shown in FIG. 3, the headlight control system 304 may include an onboard (e.g., installed in the subject vehicle 302) V2X device 310 that is configured to receive V2X communications from other (external) V2X devices as well as information from one or more sensors of a vehicular sensor system 312. As described herein, the sensors may be configured to monitor conditions external to the subject vehicle 302 to determine whether the object is in the target area of illumination of the vehicle's headlights. In an aspect, the onboard V2X device 310 may be further configured to adjust the illumination intensity and/or illumination pattern of the adjustable headlights 308 through a headlight interface 314. In turn, the headlight interface 314 may provide signals to a headlight driver system 316 that drives the lighting elements of the adjustable headlights 308.

In accordance with certain aspects of the disclosure, the (vehicular) sensor system 312 may also include one or more sensors that monitor conditions interior to the passenger compartment of the vehicle. In the example shown in FIG. 3, such interior sensors may include one or more image sensors 318 that are configured to monitor the eyes 320 of the driver 306. Based on the information derived from the one or more image sensors 318, the onboard V2X device 310 may determine the state of the gaze of the driver 306. Such information may be indicative of the driver's eye movements, an open and/or closed state of the driver's eyes, the behavior of one or both irises of the driver's eyes, or any combination thereof.

In certain aspects, the state of the gaze of the driver may be used to determine that a potential beam blinding condition exists at the subject vehicle 302. In an aspect, the potential beam blinding condition corresponds to a likelihood of interference with the safe operation of the vehicle due to excessive headlight illumination of the subject vehicle 302 by the headlights of a further vehicle. Additionally or alternatively, a potential blinding condition due to an activated rear fog light of a further vehicle driving in front of the subject vehicle 302 may be determined based on the state of the gaze of the driver. Interference with the safe operation of the subject vehicle 302 may occur when the driver 306 operating the subject vehicle 302 is blinded by the headlights or the rear fog light of the further vehicle. Interference with the safe operation of an autonomously driven vehicle may also occur when one or more sensors used to control the driving of the subject vehicle 302 are overexposed by the headlights or rear fog light of the further vehicle. In response to the determination that the potential (beam) blinding condition exists at the subject vehicle, the onboard V2X device of the subject vehicle 302 may transmit one or more V2X safety messages, e.g., to the further vehicle or as a broadcast transmission, indicating that the potential (beam) blinding condition exists at the subject vehicle 302. The scenario of a potential blinding condition due to a rear fog light may be discerned from the scenario of a potential blinding condition due to the headlights of the further vehicle based on sensor data from one or more vehicular sensors such as a camera sensor and/or map data, e.g., both vehicles are driving in the same lane. In the case of a potential blinding condition due to a rear fog light, the transmitted V2X safety messages may expressly indicate to the V2X device of the further vehicle to deactivate the rear fog light, e.g., using a rear fog light control system of the vehicle. Additional V2X information indicating the current position, projected position, movement parameters, and/or vehicle type of the subject vehicle 302 noted herein may also be transmitted by the onboard V2X device of the subject vehicle 302.

Figure 4B:
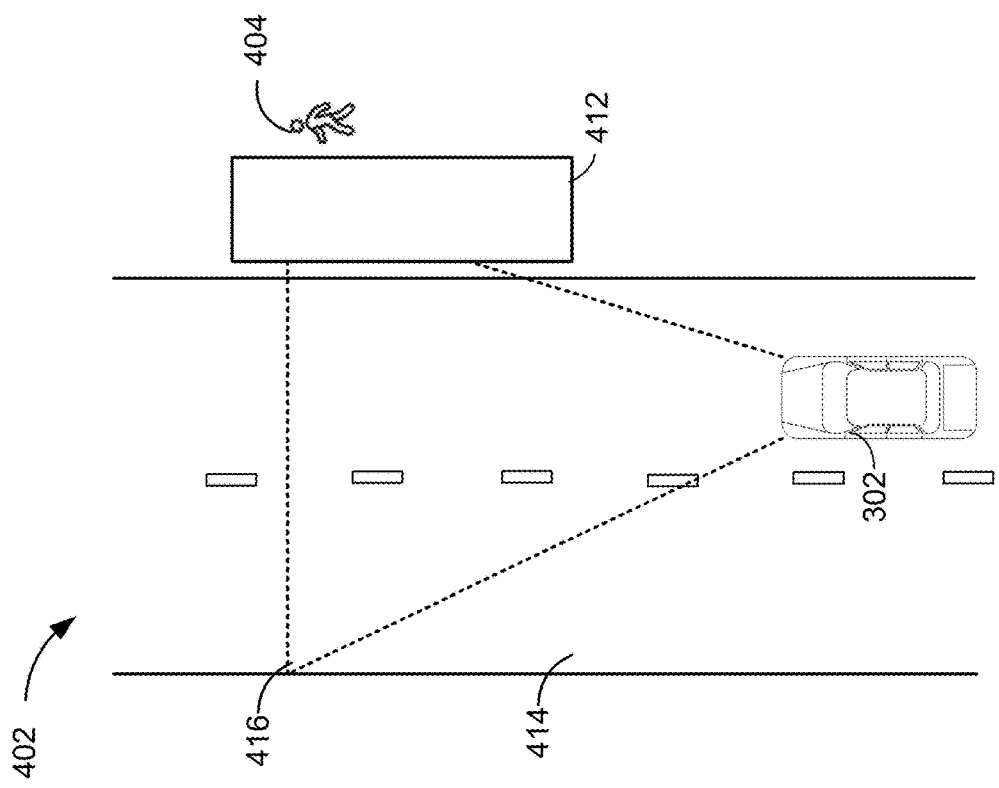
FIG. 4A and FIG. 4B depict scenarios in which the object associated with a vehicle-to-everything (V2X) safety message is a pedestrian, according to aspects of the disclosure.
Figure 4A:
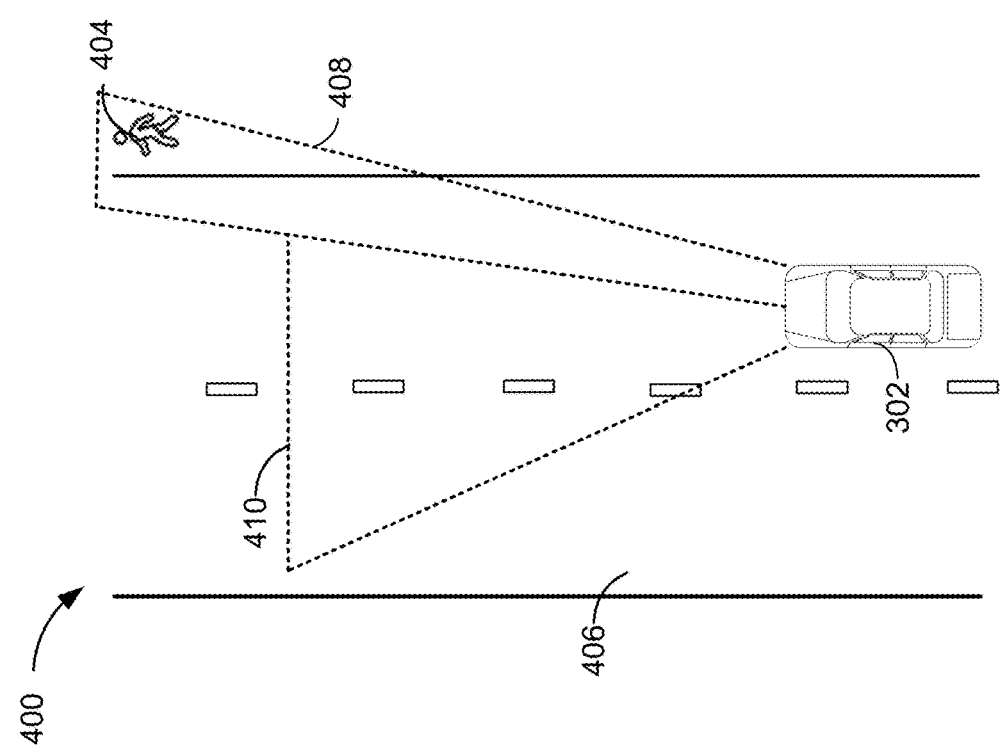

FIG. 4A and FIG. 4B depict scenarios 400, 402 in which the object is a pedestrian 404, according to aspects of the disclosure. In scenario 400, a V2X device (not shown) carried by the pedestrian 404 transmits a V2X safety message indicating that a potential safety condition exists with respect to the illumination of the pedestrian 404. The subject vehicle 302 is moving along a roadway 406 and the onboard V2X system receives the V2X safety message from the V2X device carried by the pedestrian 404. Based on the position and/or projected future position of the pedestrian 404 and any supplemental information provided by sensors and/or map data, the onboard V2X system of the subject vehicle 302 has determined that the pedestrian 404 is within or approaching a target area 408 in which illumination of the object by the headlights of the subject vehicle 302 can be adjusted to mitigate the potential safety condition. In this example, the onboard V2X device has been configured to increase the illumination of the pedestrian 404 to make the pedestrian 404 more visible to the driver of the subject vehicle 302 and/or sensors used to autonomously drive the subject vehicle 302. The illustrative target area 408 in this example may be a target area defined based on an illumination capability of the headlights, e.g., with regard to an area that can be illuminated but is currently not illuminated to a desired illumination level. It is understood that the illustrated target area 408 is not limited to the illustrated beam angle but can be wider, e.g., following the illumination angle 410. However, it will be recognized, based on the teachings of the present disclosure, that the V2X device may be configured to reduce the illumination of the pedestrian 404 to prevent blinding the pedestrian 404. In this case, the target area 408 may be based on a current illumination intensity and/or illumination pattern of the headlight.

In an aspect, the onboard V2X device of the subject vehicle 302 may control the headlight beams to have different illumination intensities in different areas of headlight illumination. Here, the onboard V2X device has determined that pedestrian 404 is located within the target area 408 of illumination. The onboard V2X device may control the headlights to provide light beams having a higher illumination intensity directed toward the pedestrian 404 than the illumination intensity of the light beams directed to another area of illumination 410 which does not include the pedestrian 404. However, it will be recognized, based on the teachings of the present disclosure, that the headlights may be controlled to have a reduced illumination intensity of light beams emitted toward the pedestrian 404 to prevent blinding the pedestrian 404. In accordance with certain aspects of the disclosure in which the headlights operate in a more conventional manner (e.g., on, hi-intensity, low-intensity), the onboard V2X device may direct the headlights to transition from a low-intensity state to a high-intensity state to increase the illumination of the pedestrian 404 or from the high-intensity state to the low-intensity state to prevent blinding of the pedestrian 404.

In scenario 402, the V2X device carried by the pedestrian 404 is likewise transmitting V2X safety messages indicating that a potential safety condition exists with respect to the illumination of the pedestrian 404. The subject vehicle 302 is moving along a roadway 414 and the onboard V2X system receives the V2X safety message from the V2X device carried by the pedestrian 404. Based on the position and/or projected future position of the pedestrian 404 and any supplemental information provided by sensors and/or map data, the onboard V2X system of the subject vehicle 302 has determined that a building 412 obstructs the illumination of the pedestrian 404 by the subject vehicle's headlights. In other words, the target area 408 of FIG. 4A is restricted by the building 412 to exclude the pedestrian 404. Accordingly, the onboard V2X device need not make any adjustments to the subject vehicle's headlights in response to the V2X safety message associated with the pedestrian 404 and may continue to illuminate area 416 without adjusting the headlight illumination settings. In accordance with various aspects of the disclosure, the determination that the building 412 is an occluding object that blocks the headlights of the vehicle from the pedestrian 404 may be based on the current position of the pedestrian 404, the projected future position of the pedestrian 404, sensor information indicating the presence of the building 412, map data indicating the presence of the building 412, a current position of the subject vehicle 302, a projected future position of the subject vehicle 302, or a combination thereof.

Figure 5C:
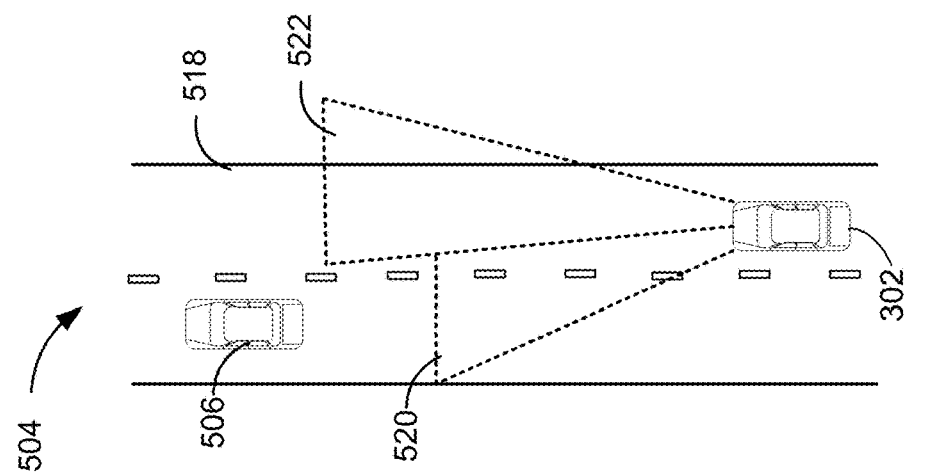
FIG. 5A, FIG. 5B, and FIG. 5C depict scenarios in which the object associated with the V2X safety message is a further vehicle, according to aspects of the disclosure.
Figure 5B:
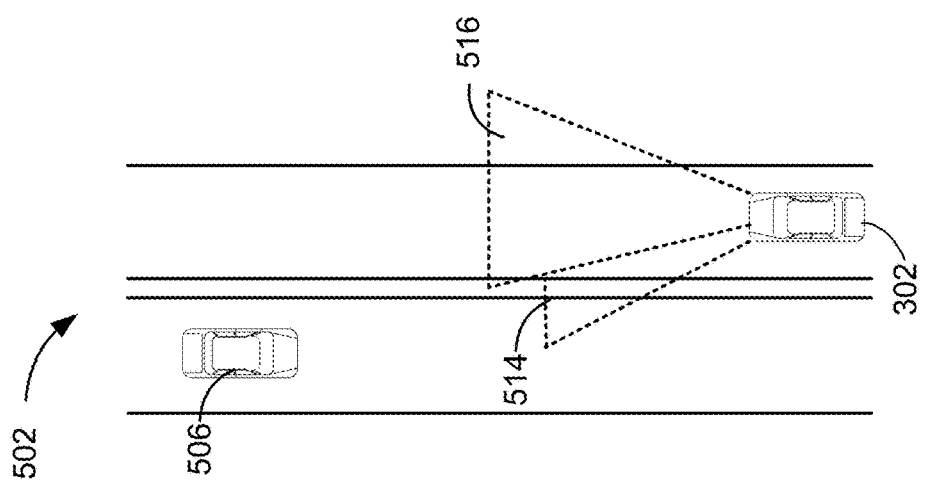
Figure 5A:
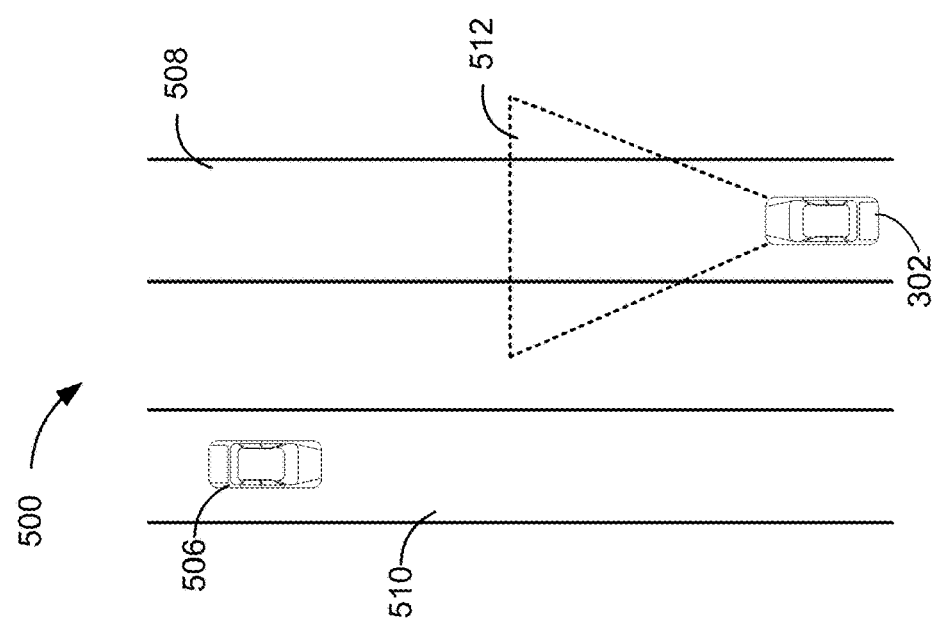

FIG. 5A, FIG. 5B, and FIG. 5C depict scenarios 500, and 502, and 504 in which the object is a further vehicle 506, according to aspects of the disclosure. In scenario 500 shown in FIG. 5A, a V2X device (not shown) onboard the further vehicle 506 transmits V2X safety messages indicating that a potential safety condition (e.g., blinded driver or blinded sensor condition) exists with respect to the illumination of the further vehicle 506 by the headlights of the subject vehicle 302. The subject vehicle 302 is moving along a roadway or lane 508 and the further vehicle 506 is moving along a further roadway or lane 510. Based on the position and/or projected future position of the further vehicle 506 and any supplemental information provided by sensors and/or map data, the onboard V2X system of the subject vehicle 302 has determined that the further vehicle 506 is not within or approaching a target area in which illumination of the object by headlights of the subject vehicle 302 can be adjusted to mitigate the potential safety condition. The target area may be determined based on a current illumination intensity and/or illumination pattern of the headlights. For example, the onboard V2X device of the subject vehicle 302 may determine that the relationship between roadways 508 and 510 is such that they are separated from one another (e.g., horizontal separation, vertical separation, oriented in different directions, etc.) by a sufficient degree so as not to result in the safety condition. In another example in which the headlights are not adjusted, the onboard V2X device of the subject vehicle 302 may determine that an occluding object (e.g., roadway dividers, trees, etc.) blocks the headlights of the subject vehicle 302 from illuminating the further vehicle 506 (and thereby restricts the target area such that the further roadway 510 lies outside the target area). Consequently, the headlights of the subject vehicle 302 continue to operate with an illumination intensity and/or illumination pattern that illuminates area 512 without any adjustment for the safety condition indicated in the received V2X safety message.

In scenario 502 shown in FIG. 5B, the V2X device onboard the further vehicle 506 transmits the V2X safety messages indicating that the potential safety condition (e.g., blinded driver or blinded sensor condition) exists with respect to the illumination of the further vehicle 506 by the headlights of the subject vehicle 302. Again, the subject vehicle 302 is moving along a roadway or lane 508 and the further vehicle 506 is moving along a further roadway or lane 510. Based on the position and/or projected future position of the further vehicle 506 and any supplemental information provided by sensors and/or map data, the onboard V2X system of the subject vehicle 302 has determined that the further vehicle 506 is within a target area 514 in which illumination of the object by headlights of the subject vehicle 302 can be adjusted to mitigate the potential safety condition. The target area 514 may be determined based on the current illumination intensity and/or illumination pattern of the headlights of subject vehicle 302. For example, the onboard V2X device of the subject vehicle 302 may determine that the relationship between roadways 508 and 510 is such that they are not separated from one another by a sufficient degree to mitigate the safety condition absent an adjustment to the illumination intensity and/or illumination pattern of the headlights of the subject vehicle 302. Consequently, the headlights of the subject vehicle 302 are adjusted by the onboard V2X system to reduce the illumination toward the further vehicle 506, e.g., by dimming and/or deactivating (groups of) individual lighting elements of the (left) headlight. In certain aspects, the intensity of the headlights illuminating area 516 may be maintained at the existing intensity without further adjustment.

Scenario 504 shown in FIG. 5C is similar to scenario 502, except that both the subject vehicle 302 and further vehicle 506 are traveling in the same direction but in different lanes of the same roadway 518. Based on the position and/or projected future position of the further vehicle 506 and any supplemental information provided by sensors and/or map data, the onboard V2X system of the subject vehicle 302 has determined that the further vehicle 506 is within or approaching a target area 520 in which illumination of the object by headlights of the subject vehicle 302 can be adjusted to mitigate the potential safety condition. Consequently, the headlights of the subject vehicle 302 are adjusted by the onboard V2X system to reduce the illumination toward the further vehicle 506. In certain aspects, the intensity of the headlights illuminating area 522 may be maintained at the existing intensity without further adjustment.

Figure 6B:
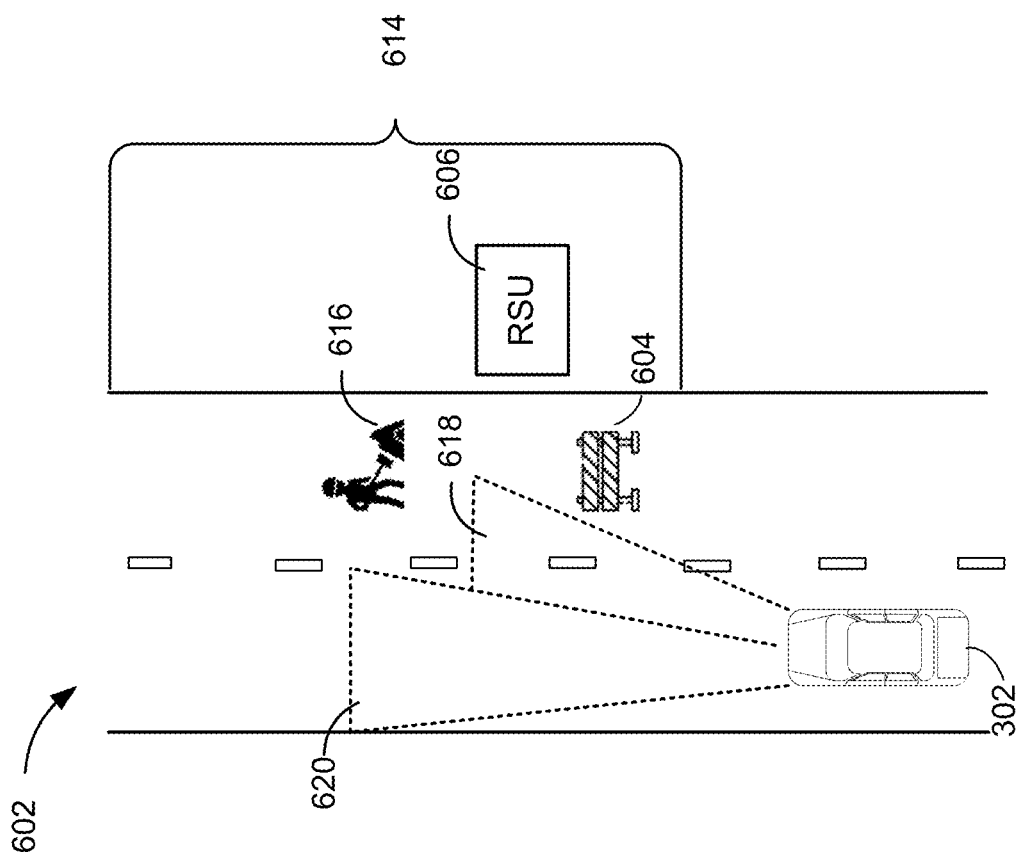
FIG. 6A and FIG. 6B depict scenarios in which one or more objects associated with the V2X safety message are further associated with a construction zone, according to aspects of the disclosure.
Figure 6A:
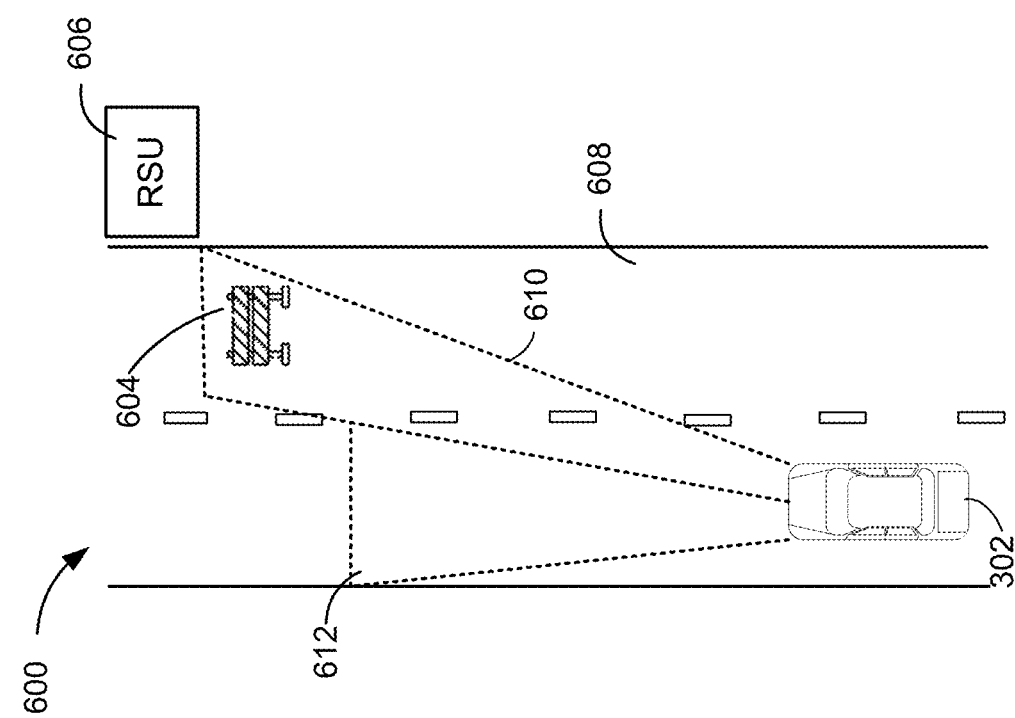

FIG. 6A and FIG. 6B depict scenarios 600 and 602 in which one or more objects are associated with a construction zone, according to aspects of the disclosure. In scenario 600 shown in FIG. 6A, a V2X device associated with a road construction sign 604 transmits V2X safety messages indicating that a potential safety condition (e.g., a need to make the object (road construction sign 604) visible to a driver of a vehicle and/or to image sensors of an autonomous vehicle) exists with respect to the illumination of the road construction sign 604 by the headlights of the subject vehicle 302. The V2X device transmitting the V2X safety message may be attached to or otherwise co-located with the road construction sign 604. Additionally, or in the alternative, the V2X safety message may be transmitted by an RSU 606 having knowledge of the location of the road construction sign 604 and, optionally, knowledge of the object type (e.g., knowledge that it is road signage and/or knowledge that it is a road construction sign).

In scenario 600, the subject vehicle 302 is moving along a roadway or road 608 and the road construction sign 604 is in a lane of roadway 608 adjacent to the lane of travel of the subject vehicle 302. Based on the position of the road construction sign 604 and any supplemental information provided by sensors and/or map data, the onboard V2X system of the subject vehicle 302 has determined that the road construction sign 604 is within a target area 610 in which illumination of the road construction sign 604 by headlights of the subject vehicle 302 can be adjusted to mitigate the potential safety condition. The target area 610 may be defined based on an illumination capability of the headlights, e.g., with regard to an area that can be illuminated but is currently not illuminated to a desired illumination level. It is understood that the illustrated target area 610 is not limited to the illustrated beam angle but can be wider, e.g., including the illumination angle 612. Consequently, the headlights of the subject vehicle 302 are adjusted by the onboard V2X system to increase the illumination toward the road construction sign 604. In certain aspects, the intensity of the headlights in illumination area 612 may be maintained at the existing intensity without further adjustment.

In scenario 602 shown in FIG. 6B, the subject vehicle has passed the road construction sign 604 and is approaching a construction zone 614 in which workers 616 are present. In an aspect, a V2X device associated with the presence of the workers 616 transmits V2X safety messages indicating that a potential safety condition (e.g., a blinding condition of the workers) exists with respect to the illumination of the workers 616 by the headlights of the subject vehicle 302. The V2X safety messages may be transmitted by a V2X device carried by one or more of the workers 616 or otherwise co-located with the workers 616 within the construction zone 614. Additionally, or in the alternative, the V2X safety messages may be transmitted by the RSU 606 having knowledge of the location of the construction zone and knowledge that there are workers 616 present within the construction zone 614.

Based on the location of the construction zone 614 and/or location of the workers 616 and any supplemental information provided by sensors and/or map data, the onboard V2X system of the subject vehicle 302 has determined that the workers 616 are within a target area 618 in which illumination of the object by headlights of the subject vehicle 302 can be adjusted to mitigate the potential safety condition. The target area may be determined based on a current illumination intensity and/or illumination pattern of the headlights. Consequently, the headlights of the subject vehicle 302 are adjusted by the onboard V2X system to reduce the illumination toward the workers 616. In certain aspects, the intensity of the headlights illuminating area 620 may be maintained at the existing intensity without further adjustment.

Figure 7:
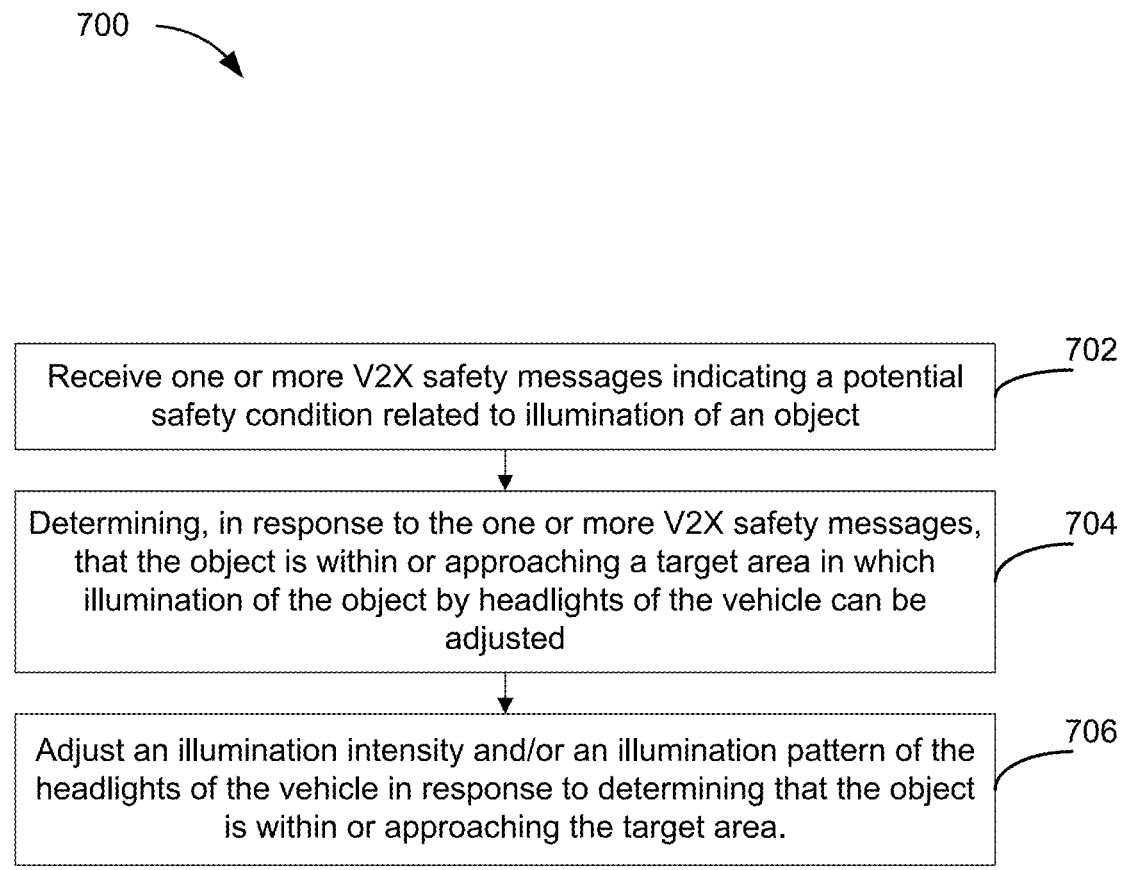
FIG. 7 illustrates an example method of wireless communication performed by a V2X device onboard a vehicle, according to aspects of the disclosure.

FIG. 7 illustrates an example method 700 of wireless communication performed by a vehicle-to-everything (V2X) device onboard a vehicle, according to aspects of the disclosure. At operation 702, the V2X device receives one or more V2X safety messages indicating a potential safety condition related to illumination of an object. In an aspect, operation 702 may be performed by the one or more WWAN transceivers 210, the one or more processors 232, memory 240, and/or headlight control component 242, any or all of which may be considered means for performing this operation.

At operation 704, the V2X device, determines, in response to the one or more V2X safety messages, that the object is within or approaching a target area in which illumination of the object by headlights of the vehicle can be adjusted. In an aspect, operation 704 may be performed by the one or more WWAN transceivers 210, the one or more processors 232, memory 240, and/or headlight control component 242, any or all of which may be considered means for performing this operation.

At operation 706, the V2X device adjusts an illumination intensity and/or an illumination pattern of the headlights of the vehicle in response to determining that the object is within the target area. In an aspect, operation 704 may be performed by the one or more WWAN transceivers 210, the one or more processors 232, memory 240, and/or headlight control component 242, any or all of which may be considered means for performing this operation.

As will be appreciated, a technical advantage of the method 700 is that the V2X device adjusts the illumination provided by the headlights of the vehicle to mitigate a potential safety condition indicated in a V2X safety message received by the V2X device.

Figure 8:
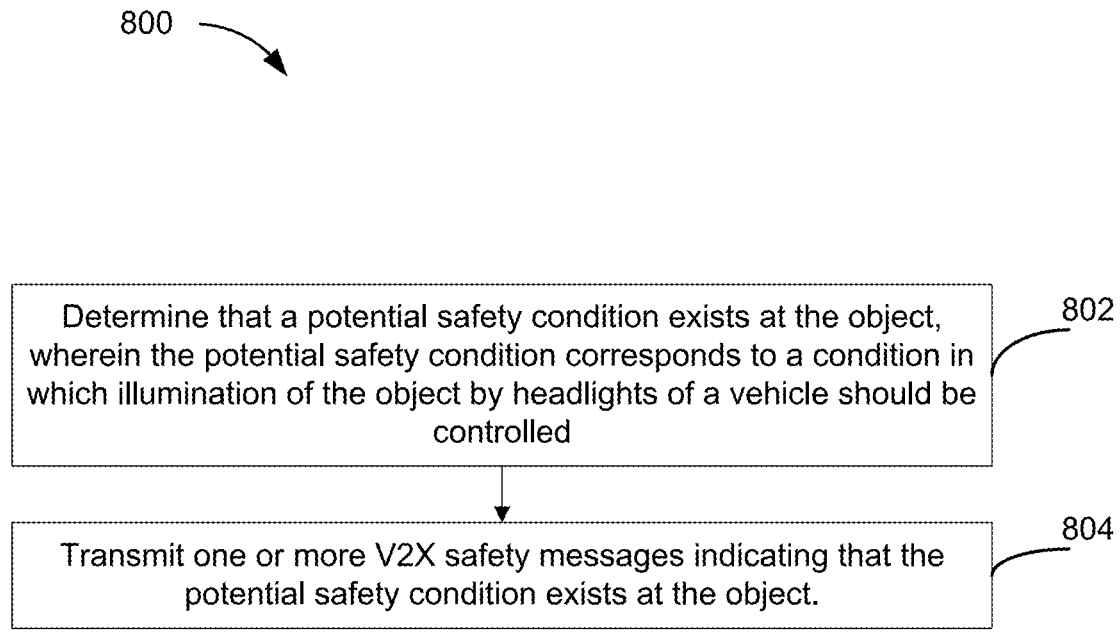
FIG. 8 illustrates an example method of wireless communication performed by a V2X device associated with an object, according to aspects of the disclosure.

FIG. 8 illustrates an example method 800 of wireless communication performed by a vehicle-to-everything (V2X) device associated with (e.g., attached to or co-located with or having knowledge of a potential safety condition at) an object, according to aspects of the disclosure. At operation 802, the V2X device determines that a potential safety condition exists at the object, wherein the potential safety condition corresponds to a condition in which illumination of the object by headlights of a vehicle should be controlled (e.g., to attempt to make the object visible, or to mitigate a blinding condition at the object). In an aspect, operation 802 may be performed by the one or more WWAN transceivers 210, the one or more processors 232, and/or memory 240, any or all of which may be considered means for performing this operation.

At operation 804, the V2X device transmits one or more V2X safety messages indicating that the potential safety condition exists at the object. In an aspect, operation 804 may be performed by the one or more WWAN transceivers 210, the one or more processors 232, and/or memory 240, any or all of which may be considered means for performing this operation.

As will be appreciated, a technical advantage of the method 800 is that the V2X device transmits a V2X safety message indicating a potential safety indication that can be mitigated by controlling the headlights of a vehicle receiving the V2X safety message.

Figure 9:
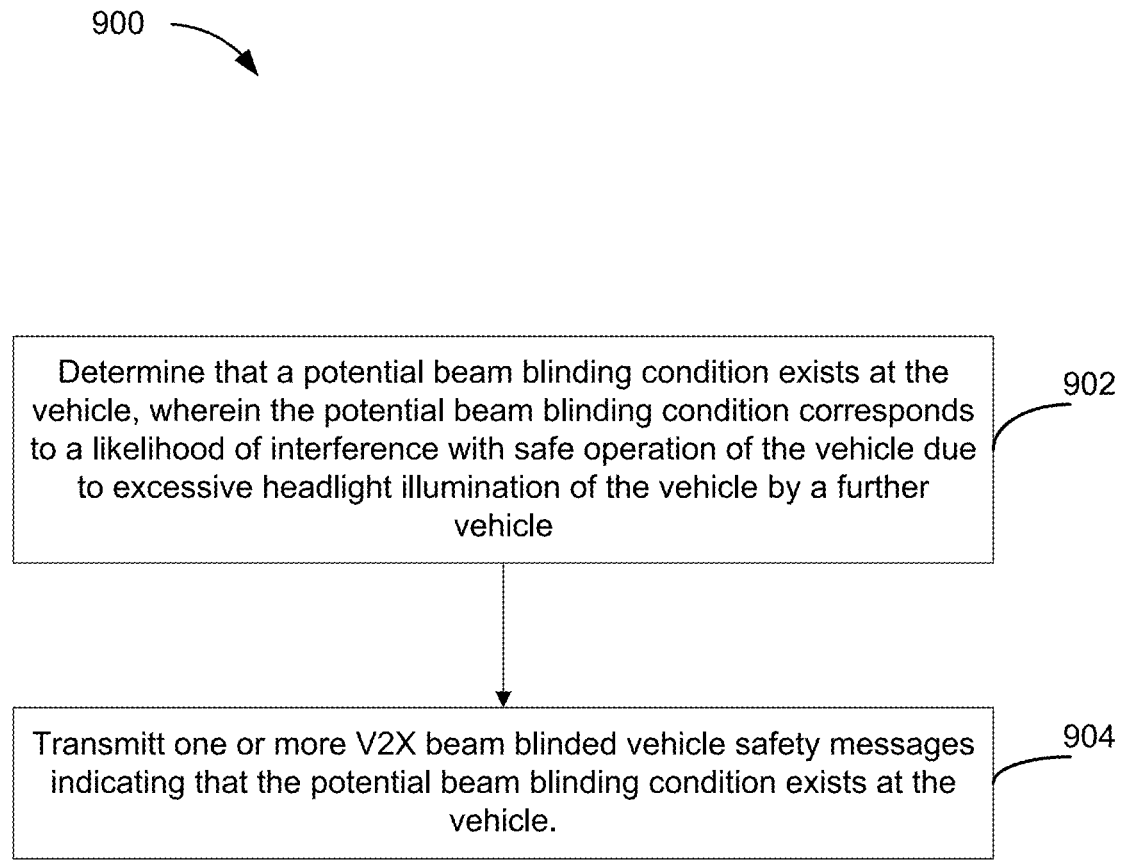
FIG. 9 illustrates an example method of wireless communication performed by a V2X device onboard a vehicle, according to aspects of the disclosure.

FIG. 9 illustrates an example method 900 of wireless communication performed by a vehicle-to-everything (V2X) device onboard a vehicle, according to aspects of the disclosure. At operation 902, the V2X device determines that a potential (beam) blinding condition exists at the vehicle, wherein the potential (beam) blinding condition corresponds to a likelihood of interference with safe operation of the vehicle due to excessive headlight or rear fog light illumination of the vehicle by a further vehicle. In an aspect, operation 902 may be performed by the one or more WWAN transceivers 210, the one or more processors 232, memory 240, and/or headlight control component 242, any or all of which may be considered means for performing this operation.

At operation 904, the V2X device transmits one or more V2X safety messages indicating that the potential (beam) blinding condition exists at the vehicle. In an aspect, operation 904 may be performed by the one or more WWAN transceivers 210, the one or more processors 232, memory 240, and/or headlight control component 242, any or all of which may be considered means for performing this operation.

As will be appreciated, a technical advantage of the method 800 is that the V2X device detects conditions that could result in a potential blinding of a driver of a vehicle by headlights or a rear fog light of a further vehicle. Based on the detection of the potential blinding conditions, the V2X device transmits a V2X safety message indicating the potential blinding. The further vehicle may receive the V2X safety message and make any appropriate adjustments to its headlights or rear fog light to mitigate the potential blinding condition.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a vehicle-to-everything (V2X) device onboard a vehicle, comprising: receiving one or more V2X safety messages indicating a potential safety condition related to illumination of an object; determining, in response to the one or more V2X safety messages, that the object is within or approaching a target area in which illumination of the object by headlights of the vehicle can be adjusted; and controlling an illumination intensity and/or an illumination pattern of the headlights of the vehicle in response to determining that the object is within the target area.

Clause 2. The method of clause 1, further comprising: determining the target area based on a current illumination intensity and/or a current illumination pattern of the headlights of the vehicle.

Clause 3. The method of any of clauses 1 to 2, further comprising: determining the target area based on an illumination capability of the headlights of the vehicle.

Clause 4. The method of any of clauses 1 to 3, further comprising: determining the target area based on a current position of the vehicle and/or a projected future position of the vehicle using one or more vehicular sensors.

Clause 5. The method of any of clauses 1 to 4, further comprising: detecting obstructions blocking the headlights of the vehicle from illuminating part of an environment of the vehicle; and determining the target area based on the detected obstructions.

Clause 6. The method of clause 5, wherein: detecting obstructions blocking the headlights is based on sensor data received from one or more vehicular sensors.

Clause 7. The method of clause 6, wherein: the one or more sensors include one or more light detection and ranging (LIDAR) sensors.

Clause 8. The method of any of clauses 6 to 7, wherein: the one or more sensors include one or more radio detection and ranging (RADAR) sensors.

Clause 9. The method of any of clauses 6 to 8, wherein: the one or more sensors include one or more image sensors.

Clause 10. The method of any of clauses 1 to 9, further comprising: detecting ambient lighting conditions exterior to the vehicle; and determining the target area based on the ambient lighting conditions.

Clause 11. The method of any of clauses 1 to 10, wherein controlling the illumination intensity and/or the illumination pattern of the headlights comprises: controlling illumination intensities of one or more of a plurality of light-emitting elements of the headlights.

Clause 12. The method of clause 11, wherein: the illumination intensities of the one or more of the plurality of light-emitting elements of the headlights are adjusted to provide an illumination pattern that emits light at an increased intensity toward the object.

Clause 13. The method of clause 12, wherein: the illumination pattern is asymmetric between a left-side headlight illumination intensity and a right-side headlight illumination intensity.

Clause 14. The method of any of clauses 1 to 11, wherein: the potential safety condition is a condition in which the object should be illuminated to make the object visible to a driver of the vehicle; and the illumination intensity and/or the illumination pattern of the headlights are adjusted to increase intensity of light beams emitted toward the object.

Clause 15. The method of any of clauses 1 to 11, wherein: the potential safety condition is a condition in which illumination of the object should be limited to reduce a likelihood of blinding an individual at the object; and the illumination intensity and/or the illumination pattern of the headlights are adjusted to decrease intensity of light beams emitted toward the object.

Clause 16. The method of any of clauses 1 to 11, wherein: the potential safety condition is a condition in which the object should be illuminated to make the object visible to one or more image sensors used in an autonomous driving system of the vehicle; and the illumination intensity and/or the illumination pattern of the headlights are adjusted to increase intensity of light beams emitted toward the object.

Clause 17. The method of any of clauses 1 to 11, wherein: the potential safety condition is a condition in which illumination of the object should be limited to reduce a likelihood of overexposing one or more image sensors at the object; and the illumination intensity and/or the illumination pattern of the headlights are adjusted to decrease intensity of light beams emitted toward the object.

Clause 18. The method of any of clauses 1 to 17, wherein: the one or more V2X safety messages indicating the potential safety condition related to illumination of the object are received from a roadside unit (RSU).

Clause 19. The method of any of clauses 1 to 18, wherein: the object is a further vehicle; and the one or more V2X safety messages indicating the potential safety condition related to illumination of the object are received from a V2X device onboard the further vehicle.

Clause 20. The method of any of clauses 1 to 18, wherein: the object is a non-motorized vehicle; and the one or more V2X safety messages indicating the potential safety condition related to illumination of the object are received from a V2X device carried by the non-motorized vehicle.

Clause 21. The method of any of clauses 1 to 18, wherein: the object is a pedestrian; and the one or more V2X safety messages indicating the potential safety condition related to illumination of the pedestrian are received from a V2X device carried by the pedestrian.

Clause 22. The method of any of clauses 1 to 18, wherein: the object is road signage; and the illumination intensity and/or the illumination pattern of the headlights are adjusted to increase intensity of light beams emitted toward the road signage.

Clause 23. The method of any of clauses 1 to 18, wherein: the object is a roadside hazard; and the illumination intensity and/or the illumination pattern of the headlights are adjusted to increase intensity of light beams emitted toward the roadside hazard.

Clause 24. The method of any of clauses 1 to 18, wherein: the object is an emergency vehicle; and the illumination intensity and/or the illumination pattern of the headlights are adjusted to reduce intensity of light beams emitted toward the emergency vehicle.

Clause 25. The method of any of clauses 1 to 24, wherein: determining that the object is within the target area comprises determining a current position of the object and/or a projected future position of the object based on the one or more V2X safety messages and/or further V2X communications.

Clause 26. The method of clause 25, wherein: determining that the object is within the target area is further based on map data.

Clause 27. The method of clause 26, wherein: determining that the object is within the target area comprises detecting road lanes used by the object based on the map data.

Clause 28. The method of any of clauses 26 to 27, wherein: the map data includes V2X map data.

Clause 29. The method of any of clauses 26 to 28, wherein: the map data includes local map data.

Clause 30. The method of any of clauses 25 to 29, wherein: the current position of the object is based on location information indicated in V2X communications relating to the object.

Clause 31. The method of any of clauses 25 to 30, wherein the projected future position of the object is based on the current position of the object and: a speed of the object indicated in V2X communications relating to the object, a heading of the object indicated in V2X communications relating to the object, a projected path of the object indicated in V2X communications relating to the object, or any combination thereof.

Clause 32. A method of wireless communication performed by a vehicle-to-everything (V2X) device associated with an object, comprising: determining that a potential safety condition exists at the object, wherein the potential safety condition corresponds to a condition in which illumination of the object by headlights of a vehicle should be controlled; and transmitting one or more V2X safety messages indicating that the potential safety condition exists at the object.

Clause 33. A method of wireless communication performed by a vehicle-to-everything (V2X) device onboard a vehicle, comprising: determining that a potential beam blinding condition exists at the vehicle, wherein the potential beam blinding condition corresponds to a likelihood of interference with safe operation of the vehicle due to excessive headlight illumination of the vehicle by a further vehicle; and transmitting one or more V2X beam blinded vehicle safety messages indicating that the potential beam blinding condition exists at the vehicle.

Clause 34. The method of clause 33, wherein: determining that the potential beam blinding condition exists is based on information indicating a state of a gaze of a driver of the vehicle derived from one or more image sensors.

Clause 35. The method of clause 34, wherein: the information derived from the one or more image sensors indicates eye movement of the driver.

Clause 36. The method of any of clauses 34 to 35, wherein: the information derived from the one or more image sensors indicates an open and/or closed state of eyes of the driver.

Clause 37. The method of any of clauses 34 to 36, wherein: the information derived from the one or more image sensors indicates behavior of one or both irises of eyes of the driver.

Clause 38. The method of any of clauses 33 to 37, wherein: determining that the potential beam blinding condition exists is based on information regarding a state of the further vehicle indicated in V2X communications received from the further vehicle.

Clause 39. The method of clause 38, wherein: the information regarding the state of the further vehicle indicates a location of the further vehicle.

Clause 40. The method of clause 39, wherein: the information regarding the state of the further vehicle indicates motion characteristics of the further vehicle.

Clause 41. The method of clause 40, wherein the motion characteristics of the further vehicle include: a speed of the further vehicle; a heading of the further vehicle; a projected path of the further vehicle; or any combination thereof.

Clause 42. The method of any of clauses 38 to 41, wherein: the information regarding the state of the further vehicle indicates a vehicle type of the further vehicle.

Clause 43. The method of any of clauses 38 to 42, wherein: the information regarding the state of the further vehicle indicates a headlight state of the further vehicle.

Clause 44. The method of any of clauses 33 to 43, wherein: determining that the potential beam blinding condition exists is based on information provided by one or more image sensors mounted to the vehicle.

Clause 45. The method of clause 44, wherein: the information provided by the one or more image sensors indicates ambient lighting conditions at an exterior of the vehicle.

Clause 46. The method of any of clauses 44 to 45, wherein: the information provided by the one or more image sensors indicates ambient lighting conditions proximate eyes of a driver of the vehicle.

Clause 47. The method of any of clauses 44 to 46, wherein: the information provided by the one or more image sensors indicates ambient lighting conditions in an interior cabin of the vehicle.

Clause 48. A vehicle-to-everything (V2X) device onboard a vehicle, comprising: a memory; at least one transceiver; and at least one processor communicatively coupled to the memory and the at least one transceiver, the at least one processor configured to: receive, via the at least one transceiver, one or more V2X safety messages indicating a potential safety condition related to illumination of an object; determine, in response to the one or more V2X safety messages, that the object is within or approaching a target area in which illumination of the object by headlights of the vehicle can be adjusted; and adjust an illumination intensity and/or an illumination pattern of the headlights of the vehicle in response to determining that the object is within the target area.

Clause 49. The V2X device of clause 48, wherein the at least one processor is further configured to: determine the target area based on a current illumination intensity and/or a current illumination pattern of the headlights of the vehicle.

Clause 50. The V2X device of any of clauses 48 to 49, wherein the at least one processor is further configured to: determine the target area based on an illumination capability of the headlights of the vehicle.

Clause 51. The V2X device of any of clauses 48 to 50, wherein the at least one processor is further configured to: determine the target area based on a current position of the vehicle and/or a projected future position of the vehicle using one or more vehicular sensors.

Clause 52. The V2X device of any of clauses 48 to 51, wherein the at least one processor is further configured to: detect obstructions blocking the headlights of the vehicle from illuminating part of an environment of the vehicle; and determine the target area based on the detected obstructions.

Clause 53. The V2X device of clause 52, wherein: detect obstructions blocking the headlights is based on sensor data received from one or more vehicular sensors.

Clause 54. The V2X device of clause 53, wherein: the one or more sensors include one or more light detection and ranging (LIDAR) sensors.

Clause 55. The V2X device of any of clauses 53 to 54, wherein: the one or more sensors include one or more radio detection and ranging (RADAR) sensors.

Clause 56. The V2X device of any of clauses 53 to 55, wherein: the one or more sensors include one or more image sensors.

Clause 57. The V2X device of any of clauses 48 to 56, wherein the at least one processor is further configured to: detect ambient lighting conditions exterior to the vehicle; and determine the target area based on the ambient lighting conditions.

Clause 58. The V2X device of any of clauses 48 to 57, wherein the at least one processor configured to adjust the illumination intensity and/or the illumination pattern of the headlights comprises the at least one processor configured to: adjust illumination intensities of one or more of a plurality of light-emitting elements of the headlights.

Clause 59. The V2X device of clause 58, wherein: the illumination intensities of the one or more of the plurality of light-emitting elements of the headlights are adjusted to provide an illumination pattern that emits light at an increased intensity toward the object.

Clause 60. The V2X device of clause 59, wherein: the illumination pattern is asymmetric between a left-side headlight illumination intensity and a right-side headlight illumination intensity.

Clause 61. The V2X device of any of clauses 48 to 58, wherein: the potential safety condition is a condition in which the object should be illuminated to make the object visible to a driver of the vehicle; and the illumination intensity and/or the illumination pattern of the headlights are adjusted to increase intensity of light beams emitted toward the object.

Clause 62. The V2X device of any of clauses 48 to 58, wherein: the potential safety condition is a condition in which illumination of the object should be limited to reduce a likelihood of blinding an individual at the object; and the illumination intensity and/or the illumination pattern of the headlights are adjusted to decrease intensity of light beams emitted toward the object.

Clause 63. The V2X device of any of clauses 48 to 58, wherein: the potential safety condition is a condition in which the object should be illuminated to make the object visible to one or more image sensors used in an autonomous driving system of the vehicle; and the illumination intensity and/or the illumination pattern of the headlights are adjusted to increase intensity of light beams emitted toward the object.

Clause 64. The V2X device of any of clauses 48 to 58, wherein: the potential safety condition is a condition in which illumination of the object should be limited to reduce a likelihood of overexposing one or more image sensors at the object; and the illumination intensity and/or the illumination pattern of the headlights are adjusted to decrease intensity of light beams emitted toward the object.

Clause 65. The V2X device of any of clauses 48 to 64, wherein: the one or more V2X safety messages indicating the potential safety condition related to illumination of the object are received from a roadside unit (RSU).

Clause 66. The V2X device of any of clauses 48 to 65, wherein: the object is a further vehicle; and the one or more V2X safety messages indicating the potential safety condition related to illumination of the object are received from a V2X device onboard the further vehicle.

Clause 67. The V2X device of any of clauses 48 to 65, wherein: the object is a non-motorized vehicle; and the one or more V2X safety messages indicating the potential safety condition related to illumination of the object are received from a V2X device carried by the non-motorized vehicle.

Clause 68. The V2X device of any of clauses 48 to 65, wherein: the object is a pedestrian; and the one or more V2X safety messages indicating the potential safety condition related to illumination of the pedestrian are received from a V2X device carried by the pedestrian.

Clause 69. The V2X device of any of clauses 48 to 65, wherein: the object is road signage; and the illumination intensity and/or the illumination pattern of the headlights are adjusted to increase intensity of light beams emitted toward the road signage.

Clause 70. The V2X device of any of clauses 48 to 65, wherein: the object is a roadside hazard; and the illumination intensity and/or the illumination pattern of the headlights are adjusted to increase intensity of light beams emitted toward the roadside hazard.

Clause 71. The V2X device of any of clauses 48 to 65, wherein: the object is an emergency vehicle; and the illumination intensity and/or the illumination pattern of the headlights are adjusted to reduce intensity of light beams emitted toward the emergency vehicle.

Clause 72. The V2X device of any of clauses 48 to 71, wherein: determine that the object is within the target area comprises determining a current position of the object and/or a projected future position of the object based on the one or more V2X safety messages and/or further V2X communications.

Clause 73. The V2X device of clause 72, wherein: determine that the object is within the target area is further based on map data.

Clause 74. The V2X device of clause 73, wherein: determine that the object is within the target area comprises detecting road lanes used by the object based on the map data.

Clause 75. The V2X device of any of clauses 73 to 74, wherein: the map data includes V2X map data.

Clause 76. The V2X device of any of clauses 73 to 75, wherein: the map data includes local map data.

Clause 77. The V2X device of any of clauses 72 to 76, wherein: the current position of the object is based on location information indicated in V2X communications relating to the object.

Clause 78. The V2X device of any of clauses 72 to 77, wherein the projected future position of the object is based on the current position of the object and: a speed of the object indicated in V2X communications relating to the object, a heading of the object indicated in V2X communications relating to the object, a projected path of the object indicated in V2X communications relating to the object, or any combination thereof.

Clause 79. A vehicle-to-everything (V2X) device onboard a vehicle, comprising: a memory; at least one transceiver; and at least one processor communicatively coupled to the memory and the at least one transceiver, the at least one processor configured to: determine that a potential safety condition exists at the object, wherein the potential safety condition corresponds to a condition in which illumination of the object by headlights of a vehicle should be controlled; and transmit, via the at least one transceiver, one or more V2X safety messages indicating that the potential safety condition exists at the object.

Clause 80. A vehicle-to-everything (V2X) device onboard a vehicle, comprising: a memory; at least one transceiver; and at least one processor communicatively coupled to the memory and the at least one transceiver, the at least one processor configured to: determine that a potential beam blinding condition exists at the vehicle, wherein the potential beam blinding condition corresponds to a likelihood of interference with safe operation of the vehicle due to excessive headlight illumination of the vehicle by a further vehicle; and transmit, via the at least one transceiver, one or more V2X beam blinded vehicle safety messages indicating that the potential beam blinding condition exists at the vehicle.

Clause 81. The V2X device of clause 80, wherein: determine that the potential beam blinding condition exists is based on information indicating a state of a gaze of a driver of the vehicle derived from one or more image sensors.

Clause 82. The V2X device of clause 81, wherein: the information derived from the one or more image sensors indicates eye movement of the driver.

Clause 83. The V2X device of any of clauses 81 to 82, wherein: the information derived from the one or more image sensors indicates an open and/or closed state of eyes of the driver.

Clause 84. The V2X device of any of clauses 81 to 83, wherein: the information derived from the one or more image sensors indicates behavior of one or both irises of eyes of the driver.

Clause 85. The V2X device of any of clauses 80 to 84, wherein: determine that the potential beam blinding condition exists is based on information regarding a state of the further vehicle indicated in V2X communications received from the further vehicle.

Clause 86. The V2X device of clause 85, wherein: the information regarding the state of the further vehicle indicates a location of the further vehicle.

Clause 87. The V2X device of clause 86, wherein: the information regarding the state of the further vehicle indicates motion characteristics of the further vehicle.

Clause 88. The V2X device of clause 87, wherein the motion characteristics of the further vehicle include: a speed of the further vehicle; a heading of the further vehicle; a projected path of the further vehicle; or any combination thereof. Clause 89. The V2X device of any of clauses 85 to 88, wherein: the information regarding the state of the further vehicle indicates a vehicle type of the further vehicle.

Clause 90. The V2X device of any of clauses 85 to 89, wherein: the information regarding the state of the further vehicle indicates a headlight state of the further vehicle.

Clause 91. The V2X device of any of clauses 80 to 90, wherein: determine that the potential beam blinding condition exists is based on information provided by one or more image sensors mounted to the vehicle.

Clause 92. The V2X device of clause 91, wherein: the information provided by the one or more image sensors indicates ambient lighting conditions at an exterior of the vehicle.

Clause 93. The V2X device of any of clauses 91 to 92, wherein: the information provided by the one or more image sensors indicates ambient lighting conditions proximate eyes of a driver of the vehicle.

Clause 94. The V2X device of any of clauses 91 to 93, wherein: the information provided by the one or more image sensors indicates ambient lighting conditions in an interior Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a vehicle-to-everything (V2X) device onboard a vehicle, comprising:
   receiving one or more V2X safety messages indicating a potential safety condition related to illumination of an object, wherein the one or more V2X safety messages indicate information relating to a location of the object;
   determining, in response to the information relating to the location of the object indicated by the one or more V2X safety messages, that the object is within or approaching a target area in which illumination of the object by headlights of the vehicle can be adjusted;

determining one or more occluded regions of the target area based on topographical features identified by the V2X device;

determining whether the object is within or outside of the one or more occluded regions based on the information relating to the location of the object indicated by the one or more V2X safety messages; and controlling an illumination intensity and/or an illumination pattern of the headlights of the vehicle in response to determining that the object is within the target area outside of the one or more occluded regions.

2. The method of claim 1, further comprising:
determining the target area based on a current illumination intensity and/or a current illumination pattern of the headlights of the vehicle.

3. The method of claim 1, further comprising:
determining the target area based on an illumination capability of the headlights of the vehicle.

4. The method of claim 1, further comprising:
determining the target area based on a current position of the vehicle and/or a projected future position of the vehicle using one or more vehicular sensors.

5. The method of claim 1, wherein:
the one or more occluded regions of the target area are determined based on topographical features identified by the V2X using sensor data received from one or more vehicular sensors.

6. The method of claim 5, wherein:
the one or more vehicular sensors include one or more light detection and ranging (LIDAR) sensors.

7. The method of claim 5, wherein:
the one or more vehicular sensors include one or more radio detection and ranging (RADAR) sensors.

8. The method of claim 5, wherein:
the one or more vehicular sensors include one or more image sensors.

9. The method of claim 1, further comprising:
detecting ambient lighting conditions exterior to the vehicle; and
determining the target area based on the ambient lighting conditions.

10. The method of claim 1, wherein controlling the illumination intensity and/or the illumination pattern of the headlights comprises: controlling illumination intensities of one or more of a plurality of light-emitting elements of the headlights.

11. The method of claim 10, wherein:
the illumination intensities of the one or more of the plurality of light-emitting elements of the headlights are adjusted to provide an illumination pattern that emits light at an increased intensity toward the object.

12. The method of claim 11, wherein:
the illumination pattern is asymmetric between a left-side headlight illumination intensity and a right-side headlight illumination intensity.

13. The method of claim 1, wherein: the potential safety condition is a condition in which the object should be illuminated to make the object visible to a driver of the vehicle; and the illumination intensity and/or the illumination pattern of the headlights are controlled to increase intensity of light beams emitted toward the object.

14. The method of claim 1, wherein: the potential safety condition is a condition in which illumination of the object should be limited to reduce a likelihood of blinding an individual at the object; and the illumination intensity and/or the illumination pattern of the headlights are controlled to decrease intensity of light beams emitted toward the object.

15. The method of claim 1, wherein: the potential safety condition is a condition in which the object should be illuminated to make the object visible to one or more image sensors used in an autonomous driving system of the vehicle; and the illumination intensity and/or the illumination pattern of the headlights are controlled to increase intensity of light beams emitted toward the object.

16. The method of claim 1, wherein: the potential safety condition is a condition in which illumination of the object should be limited to reduce a likelihood of overexposing one or more image sensors at the object; and the illumination intensity and/or the illumination pattern of the headlights are controlled to decrease intensity of light beams emitted toward the object.

17. The method of claim 1, wherein: the one or more V2X safety messages indicating the potential safety condition related to illumination of the object are received from a roadside unit (RSU).

18. The method of claim 1, wherein: determining that the object is within the target area comprises determining a current position of the object and/or a projected future position of the object based on the information relating to the location of the object indicated by the one or more V2X safety messages and/or further V2X communications.

19. The method of claim 18, wherein:
the current position of the object is based on the information relating to the location of the object indicated by the one or more V2X safety messages.

20. The method of claim 19, wherein the projected future position of the object is based on the current position of the object and:
a speed of the object indicated in V2X communications relating to the object,
a heading of the object indicated in V2X communications relating to the object,
a projected path of the object indicated in V2X communications relating to the object, or
any combination thereof.

21. The method of claim 1, wherein:
the one or more occluded regions of the target area are determined based on the topographical features identified by the V2X device from map data.

22. The method of claim 21, wherein:
the one or more occluded regions of the target area are determined based on road lanes used by the object as determined from the map data.

23. The method of claim 21, wherein:
the map data includes V2X map data.

24. The method of claim 21, wherein:
the map data includes local map data.

25. A vehicle-to-everything (V2X) device onboard a vehicle, comprising:
a memory;
at least one transceiver; and
at least one processor communicatively coupled to the memory and the at least one transceiver, the at least one processor configured to:
receive, via the at least one transceiver, one or more V2X safety messages indicating a potential safety condition related to illumination of an object, wherein the one or more V2X safety messages indicate information relating to a location of the object;
determine, in response to the information relating to the location of the object indicated by the one or more V2X safety messages, that the object is within or approaching a target area in which illumination of the object by headlights of the vehicle can be adjusted;

determine one or more occluded regions of the target area based on topographical features identified by the V2X device;

determining whether the object is within or outside of the one or more occluded regions based on the V2X safety information indicating the location of the object and control an illumination intensity and/or an illumination pattern of the headlights of the vehicle in response to determining that the object is within the target area.

26. The V2X device of claim 25, wherein the at least one processor is further configured to:
determine the target area based on a current illumination intensity and/or a current illumination pattern of the headlights of the vehicle.

27. The V2X device of claim 25, wherein the at least one processor is further configured to:
determine the target area based on an illumination capability of the headlights of the vehicle.

28. The V2X device of claim 25, wherein the at least one processor is further configured to:
determine the target area based on a current position of the vehicle and/or a projected future position of the vehicle using one or more vehicular sensors.

29. The V2X device of claim 25, wherein:
the one or more occluded regions of the target area are determined based on topographical features identified by the V2X using sensor data received from one or more vehicular sensors.

30. The V2X device of claim 29, wherein:
the one or more vehicular sensors include one or more light detection and ranging (LIDAR) sensors.

31. The V2X device of claim 29, wherein:
the one or more vehicular sensors include one or more radio detection and ranging (RADAR) sensors.

32. The V2X device of claim 29, wherein:
the one or more vehicular sensors include one or more image sensors.

33. The V2X device of claim 25, wherein the at least one processor configured to control the illumination intensity and/or the illumination pattern of the headlights comprises the at least one processor configured to:
control illumination intensities of one or more of a plurality of light-emitting elements of the headlights.

34. The V2X device of claim 33, wherein:
the illumination intensities of the one or more of the plurality of light-emitting elements of the headlights are controlled to provide an illumination pattern that emits light at an increased intensity toward the object.

35. The V2X device of claim 33, wherein:
the illumination pattern is asymmetric between a left-side headlight illumination intensity and a right-side headlight illumination intensity.

36. The V2X device of claim 25, wherein:
determining that the object is within the target area comprises determining a current position of the object and/or a projected future position of the object based on the information relating to the location of the object indicated by the one or more V2X safety messages and/or further V2X communications.

37. The V2X device of claim 36, wherein:
the current position of the object is based on the location information relating to the location of the object indicated by the one or more V2X safety messages.

38. The V2X device of claim 25, wherein:
the one or more occluded regions of the target area are determined based on the topographical features identified by the V2X device from map data.

* * * * *